US011348241B2

(12) United States Patent
Amukotuwa et al.

(10) Patent No.: US 11,348,241 B2
(45) Date of Patent: May 31, 2022

(54) IDENTIFYING VESSEL OCCLUSIONS USING SPATIAL PATTERNS

(71) Applicant: iSchemaView, Inc., Menlo Park, CA (US)

(72) Inventors: Shalini Ambika Amukotuwa, Carlton (AU); Roland Bammer, Carlton (AU)

(73) Assignee: iSchemaView, Inc., Menlo Park, CA (US)

(*) Notice: Subject to any disclaimer, the term of this patent is extended or adjusted under 35 U.S.C. 154(b) by 0 days.

(21) Appl. No.: 17/502,003

(22) Filed: Oct. 14, 2021

(65) Prior Publication Data

US 2022/0114726 A1 Apr. 14, 2022

Related U.S. Application Data

(60) Provisional application No. 63/091,536, filed on Oct. 14, 2020.

(51) Int. Cl.
*G06T 7/00* (2017.01)

(52) U.S. Cl.
CPC .. *G06T 7/0012* (2013.01); *G06T 2207/10081* (2013.01); *G06T 2207/10088* (2013.01); *G06T 2207/20081* (2013.01); *G06T 2207/20084* (2013.01); *G06T 2207/30016* (2013.01)

(58) Field of Classification Search
CPC ......... G06T 7/0012; G06T 2207/10081; G06T 2207/10088; G06T 2207/20081; G06T 2207/20084; G06T 2207/30016
See application file for complete search history.

(56) References Cited

U.S. PATENT DOCUMENTS

| 7,643,864 | B2 | 1/2010 | Elgort et al. |
| 8,755,575 | B2 | 6/2014 | Hautvast et al. |
| 9,179,881 | B2 | 11/2015 | Menon Gopalakrishna et al. |
| 10,706,333 | B2 | 7/2020 | Li |
| 2007/0019846 | A1* | 1/2007 | Bullitt .................. G06T 7/0014 382/128 |
| 2021/0256698 | A1* | 8/2021 | Chang .................. G06T 7/0014 |

OTHER PUBLICATIONS

"International Application Serial No. PCT/US2021/055099, International Search Report dated Jan. 19, 2022", 2 pgs.
"International Application Serial No. PCT/US2021/055099, Written Opinion dated Jan. 19, 2022", 8 pgs.
Wu, Ona, et al., "Predicting Tissue Outcome in Acute Human Cerebral Ischemia Using Combined Diffusion- and Perfusion-Weighted MR imaging", Stroke, 32, (Apr. 2001), 933-942.

* cited by examiner

*Primary Examiner* — Siamak Harandi
(74) *Attorney, Agent, or Firm* — Schwegman Lundberg & Woessner, P.A.

(57) ABSTRACT

Images of individuals obtained using perfusion-based imaging techniques or diffusion-based imaging techniques can be analyzed to determine regions of the brains of the individuals where the supply of blood has been disrupted. The images can be used to generate alerts indicating the disruption of blood flow to one or more regions of the brains of the individuals. The images can be used to identify vessel segments (eg M1, M2, M3, M4, . . . ) and branches (MCA, ACA, PCA) of the brains of individuals in which abnormalities may be present.

20 Claims, 24 Drawing Sheets

| | Number | Age Median (Interquartile range) | NIHSS* Median (Interquartile range) | Male (%) |
|---|---|---|---|---|
| *All patients* | *140* | *73 (64-83)* | *5 (1-7)* | *77 (55.0%)* |
| Patients without a DVO | 70 | 68 (55-82) | 4 (1-7) | 34 (48.6%) |
| Patients with a DVO | 70 | 76 (69-84) | 5 (1-8) | 43 (61.1%) |
| *Location of DVO* | | | | |
| MCA: M2-segment** | 38 | | | |
| Proximal | 22 | | | |
| Distal | 16 | | | |
| MCA: M3-segment | 5 | | | |
| MCA: M4-segment | 8 | | | |
| ACA: A3- or A4-segment | 3 | | | |
| PCA: P2-segment | 5 | | | |
| PCA: P3- or P4-segment | 8 | | | |
| PICA | 2 | | | |
| SCA | 1 | | | |

*14 patients had an occlusion at two sites (Supplemental Table 1S), and were categorized here according to the most proximal occlusion.

** The mid-point of the Sylvian fissure on coronal imaging was used to divide M2 occlusions into proximal (if inferior) and distal (if superior). Occlusions of the superior and inferior division trunks as well as their ascending branches were included under M2-segment occlusions.

Figure 6

| DVO detection on CTA | READER 1: Fellow | | READER 2: Scientist | | READER 3: Radiologist | | READER 4: Resident | |
|---|---|---|---|---|---|---|---|---|
| | w/o Tmax | Tmax | w/o Tmax | Tmax | w/o Tmax | Tmax | w/o Tmax | Tmax |
| Sensitivity (%) | 60.0 | 90.0 | 77.1 | 95.7 | 71.4 | 90.0 | 74.3 | 95.7 |
| CI₉₅ | 47.4-72.3 | 80.7-98.6 | 65.6-86.3 | 88.0-99.1 | 59.4-81.6 | 80.5-95.9 | 62.4-84.0 | 88.0-99.1 |
| Specificity (%) | 78.6 | 95.7 | 90.0 | 98.6 | 95.7 | 100.0 | 95.7 | 98.6 |
| CI₉₅ | 67.4-87.3 | 88.0-99.1 | 80.5-95.9 | 92.3-100.0 | 88.0-99.1 | 94.9-100.0 | 88.0-99.1 | 92.3-100.0 |
| AUC | 0.693 | 0.929 | 0.836 | 0.971 | 0.836 | 0.950 | 0.850 | 0.971 |
| CI₉₅ | 0.617-0.769 | 0.886-0.973 | 0.773-0.897 | 0.944-0.999 | 0.777-0.894 | 0.913-0.983 | 0.794-0.906 | 0.944-0.999 |
| ΔAUC* | 0.186 | | 0.136 | | 0.114 | | 0.121 | |
| CI₉₅ | 0.117-0.256 | | 0.076-0.196 | | 0.062-0.166 | | 0.059-0.184 | |
| p | <0.001 | | <0.001 | | <0.001 | | <0.001 | |

CI₉₅ = 95% confidence interval
*Determined using De Long algorithm

Figure 7

| DVO detection on CTA | READER 1: Fellow | | READER 2: Scientist | | READER 3: Radiologist | | READER 4: Resident | |
|---|---|---|---|---|---|---|---|---|
| | w/o Zmax | Zmax | w/o Zmax | Zmax | w/o Zmax | Zmax | w/o Zmax | Zmax |
| Sensitivity (%) | 47.0 | 72.9 | 66.7 | 93.8 | 64.6 | 85.4 | 64.6 | 93.8 |
| CI* | 33.3 – 62.8 | 58.2 – 84.7 | 51.6 – 79.6 | 82.8 – 98.7 | 49.5 – 77.8 | 72.2 – 93.9 | 49.5 – 77.8 | 82.8 – 98.7 |
| Specificity (%) | 78.6 | 95.7 | 90.0 | 98.6 | 95.7 | 100 | 95.7 | 98.6 |
| CI* | 67.1 – 87.5 | 88.0 – 99.1 | 80.5 – 95.9 | 92.3 – 100.0 | 88.0 – 99.1 | 94.9 – 100.0 | 88.0 – 99.1 | 92.3 – 100.0 |
| AUC | 0.632 | 0.843 | 0.783 | 0.962 | 0.801 | 0.927 | 0.751 | 0.912 |
| CI* | 0.546 – 0.719 | 0.775 – 0.911 | 0.707 – 0.859 | 0.924 – 0.999 | 0.729 – 0.874 | 0.877 – 0.978 | 0.677 – 0.825 | 0.861 – 0.963 |
| ΔAUC* | 0.211 | | 0.178 | | 0.126 | | 0.160 | |
| CI* | 0.127 – 0.295 | | 0.104 – 0.253 | | 0.065 – 0.188 | | 0.084 – 0.236 | |
| p | <0.001 | | <0.001 | | <0.001 | | <0.001 | |

CI = 95% confidence interval
*Determined using De Long algorithm

Figure 8

| | Occlusion sites | READER 1: Fellow | | READER 2: Scientist | | READER 3: Radiologist | | READER 4: Resident | |
|---|---|---|---|---|---|---|---|---|---|
| | | with Tmax | w/o Tmax | with Tmax | w/o Tmax | with Tmax | w/o Tmax | with Tmax | w/o Tmax |
| 1 | Left A3 ACA and Left M3 MCA | 1 | 0 | 2 | 1 | 2 | 1 | 2 | 2 |
| 2 | Left P3 PCA and right P4 PCA | 2 | 2 | 2 | 1 | 1 | 1 | 1 | 0 |
| 3 | Right M2 MCA superior and inferior | 2 | 1 | 2 | 1 | 1 | 2 | 1 | 1 |
| 4 | Right M2 MCA and M3 MCA | 1 | 1 | 1 | 1 | 1 | 1 | 1 | 1 |
| 5 | Left P2 PCA and right PICA | 1 | 1 | 1 | 1 | 1 | 1 | 1 | 1 |
| 6 | Left M2 MCA superior division branch and inferior division trunk | 1 | 0 | 2 | 2 | 2 | 2 | 2 | 2 |
| 7 | Left M2 MCA and M3 MCA | 1 | 1 | 1 | 1 | 1 | 1 | 1 | 1 |
| 8 | Right P3 PCA and right SCA | 1 | 1 | 2 | 2 | 2 | 2 | 1 | 1 |
| 9 | Left M2 MCA and right M4 MCA | 1 | 1 | 1 | 2 | 2 | 1 | 1 | 1 |
| 10 | Right M2 MCA and right P4 PCA | 1 | 0 | 2 | 1 | 2 | 1 | 1 | 1 |
| 11 | Two right M4 MCA | 2 | 2 | 1 | 1 | 1 | 1 | 1 | 1 |
| 12 | Left M2 MCA inferior division trunk and superior division | 0 | 1 | 3 | 2 | 2 | 2 | 2 | 1 |
| 13 | Right P4 PCA and Left M4 MCA | 0 | 1 | 2 | 1 | 2 | 2 | 1 | 1 |
| 14 | Left M2 and M3 MCA | 0 | 1 | 3 | 2 | 2 | 4 | 3 | 1 |
| | Both occlusions correctly identified, numbers | 3 | 2 | 10 | 3 | 2 | 2 | 3 | 2 |

Figure 16

|  | READER 1: Fellow | | READER 2: Scientist | | READER 3: Radiologist | | READER 4: Resident | |
|---|---|---|---|---|---|---|---|---|
|  | w/o Tmax | Tmax | w/o Tmax | Tmax | w/o Tmax | Tmax | w/o Tmax | Tmax |
| Sensitivity (%) | 60.0 | 80.0 | 77.1 | 95.7 | 71.4 | 90.0 | 74.3 | 95.7 |
| CI₉₅ | 47.6 – 71.5 | 68.7 – 88.6 | 65.6 – 86.3 | 88.0 – 99.1 | 59.4 – 81.6 | 80.5 – 95.9 | 62.4 – 84.0 | 88.0 – 99.1 |
| Specificity (%) | 78.6 | 95.7 | 90.0 | 98.6 | 95.7 | 100 | 85.7 | 98.6 |
| CI₉₅ | 67.1 – 87.5 | 88.0 – 99.1 | 80.5 – 95.9 | 92.5 – 100.0 | 88.0 – 99.1 | 94.9 – 100.0 | 75.3 – 92.9 | 92.5 – 100.0 |
| PPV* (%) | 31.3 | 75.2 | 53.7 | 91.6 | 73.1 | 100 | 45.8 | 91.6 |
| CI₉₅ | 22.9 – 42.6 | 59.0 – 90.2 | 38.7 – 72.0 | 80.9 – 98.7 | 47.0 – 89.2 | N/A | 31.9 – 60.4 | 80.9 – 98.7 |
| NPV* (%) | 92.3 | 96.7 | 96.0 | 99.3 | 95.4 | 98.4 | 95.3 | 99.2 |
| CI₉₅ | 89.3 – 94.5 | 94.8 – 97.9 | 94.0 – 97.4 | 97.9 – 99.8 | 93.4 – 96.8 | 96.9 – 99.2 | 93.2 – 96.9 | 97.7 – 99.7 |
| AUC | 0.693 | 0.879 | 0.836 | 0.971 | 0.836 | 0.950 | 0.800 | 0.921 |
| CI₉₅ | 0.617–0.768 | 0.826–0.931 | 0.775–0.897 | 0.944–0.999 | 0.777–0.894 | 0.915–0.985 | 0.734–0.866 | 0.877–0.966 |
| ΔAUC** | 0.186 | | 0.136 | | 0.114 | | 0.121 | |
| CI₉₅ | 0.115–0.256 | | 0.076–0.196 | | 0.063–0.166 | | 0.059–0.184 | |
| Significance, p | <0.001 | | <0.001 | | <0.001 | | <0.001 | |

Figure 17

| | READER 1: Fellow | | READER 2: Scientist | | READER 3: Radiologist | | READER 4: Resident | |
|---|---|---|---|---|---|---|---|---|
| | w/o Tmax | Tmax | w/o Tmax | Tmax | w/o Tmax | Tmax | w/o Tmax | Tmax |
| Sensitivity (%) | 47.9 | 72.9 | 66.7 | 93.8 | 64.6 | 85.4 | 64.6 | 93.8 |
| CI95 | 33.3 - 62.8 | 58.2 - 84.7 | 52.6 - 79.6 | 82.8 - 98.7 | 49.5 - 77.8 | 72.2 - 93.9 | 49.5 - 77.8 | 82.8 - 98.7 |
| Specificity (%) | 78.6 | 95.7 | 90.0 | 98.6 | 95.7 | 100 | 85.7 | 98.6 |
| CI95 | 67.1 - 87.5 | 88.0 - 99.1 | 80.5 - 95.9 | 92.3 - 100.0 | 88.0 - 99.1 | 94.9 - 100.0 | 75.3 - 92.9 | 92.3 - 100.0 |
| PPV* (%) | 19.9 | 65.4 | 42.6 | 87.9 | 62.6 | 100 | 33.4 | 47.7 |
| CI95 | 12.7 - 29.8 | 50.1 - 85.3 | 26.3 - 60.6 | 52.0 - 98.1 | 35.2 - 83.0 | NA | 22.4 - 46.1 | 32.1 - 63.7 |
| NPV* (%) | 93.1 | 97.0 | 96.0 | 99.3 | 96.1 | 98.4 | 95.6 | 99.2 |
| CI95 | 90.0 - 94.5 | 95.2 - 98.1 | 94.2 - 97.3 | 97.9 - 99.8 | 94.5 - 97.3 | 96.9 - 99.2 | 92.6 - 97.0 | 97.7 - 99.7 |
| AUC | 0.657 | 0.843 | 0.783 | 0.962 | 0.801 | 0.927 | 0.751 | 0.912 |
| CI95 | 0.546 - 0.719 | 0.775 - 0.911 | 0.707 - 0.859 | 0.924 - 0.999 | 0.728 - 0.874 | 0.877 - 0.978 | 0.677 - 0.825 | 0.862 - 0.963 |
| ΔAUC** | 0.211 | | 0.178 | | 0.126 | | 0.160 | |
| CI95 | 0.127 - 0.295 | | 0.104 - 0.253 | | 0.063 - 0.188 | | 0.094 - 0.226 | |
| Significance, p | < 0.001 | | < 0.001 | | < 0.001 | | < 0.001 | |

| Wilcoxon signed rank test | READER 1: Fellow | READER 2: Scientist | READER 3: Radiologist | READER 4: Resident |
|---|---|---|---|---|
| Patients with DVO, p | 0.001 | 0.044 | <0.001 | 0.003 |
| Patients without DVO, p | 0.017 | <0.001 | 0.009 | 0.143 |

Figure 20

|  | READER 1: FELLOW | | READER 2: SCIENTIST | |
| --- | --- | --- | --- | --- |
|  | w/o Tmax | Tmax | w/o Tmax | Tmax |
| All patients | | | | |
| Range | 30-587 | 12-384 | 29-408 | 10-287 |
| Median | 138 | 86.5 | 161 | 49 |
| $CI_{95}$ | 130-150 | 79-101 | 140-174 | 45-58 |
| Inter-Quartile Range | 88 - 213 | 61 - 130 | 107 - 211 | 37 - 90 |
| $p$ | < 0.001 | | < 0.001 | |
| Patients without a DVO | | | | |
| Range | 30 - 464 | 13 - 276 | 40 - 408 | 10 - 176 |
| Median | 137 | 85 | 163 | 44 |
| $CI_{95}$ | 120 - 156 | 76-97 | 145- 177 | 37- 48 |
| Inter-Quartile Range | 105 - 177 | 64 - 123 | 121 - 202 | 34 - 58 |
| $p$ | < 0.001 | | < 0.001 | |
| Patients with a DVO | | | | |
| Range | 32-587 | 12-384 | 29-403 | 11-287 |
| Median | 140 | 88 | 149 | 68 |
| $CI_{95}$ | 121- 156 | 75- 118 | 126- 182 | 54 -104 |
| Inter-Quartile Range | 86- 223 | 60-146 | 88- 218 | 42- 122 |
| $p$ | < 0.001 | | < 0.001 | |

Figure 21

|  | READER 1: FELLOW | | READER 2: SCIENTIST | |
| --- | --- | --- | --- | --- |
|  | M2 occlusions | M3 and M4 occlusions | M2 occlusions | M3 and M4 occlusions |
| Without Tmax | | | | |
| Range | 32-380 | 55-273 | 34-403 | 73-321 |
| Median | 136 | 159 | 159 | 230 |
| $CI_{95}$ | 94-157 | 139-230 | 127-184 | 140-280 |
| Inter-Quartile Range | 87-187 | 142-224 | 110-213 | 143-273 |
| $P*$ | 0.2703 | | 0.0961 | |
| With Tmax | | | | |
| Range | 12-310 | 36-384 | 11-227 | 41-287 |
| Median | 81 | 77 | 61 | 113 |
| $CI_{95}$ | 68-126 | 61-157 | 42-102 | 60-161 |
| Inter-Quartile Range | 53-139 | 61-154 | 40-118 | 60-160 |
| $P*$ | 0.8968 | | 0.0315 | |

Figure 22

|  | with Tmax | | | | without Tmax | | | |
| --- | --- | --- | --- | --- | --- | --- | --- | --- |
|  | READER 1: Fellow | READER 2: Scientist | READER 3: Radiologist | READER 4: Resident | READER 1: Fellow | READER 2: Scientist | READER 3: Radiologist | READER 4: Resident |
| All DVOs (n = 70) | 14 | 3 | 7 | 3 | 28 | 16 | 20 | 18 |
| "Distal" DVOs ae excluding M2 and P2 (n = 27) | 9 | 3 | 6 | 2 | 19 | 14 | 15 | 14 |
| MCA: M2 segment** (n = 30) | 5 | 0 | 1 | 1 | 9 | 2 | 5 | 4 |
| Proximal (n = 22) | 1 | 0 | 0 | 0 | 3* | 0 | 3* | 1* |
| Distal (n = 16) | 4 | 0 | 1 | 1 | 6 | 2 | 2 | 3 |
| MCA: M3-segment (n = 3) | 0 | 1 | 0 | 0 | 4 | 3 | 1 | 2 |
| MCA: M4-segment (n = 8) | 6 | 1 | 5 | 2 | 7 | 5 | 8 | 7 |
| ACA: A3- or A4-segment (n = 3) | 2 | 0 | 0 | 0 | 3 | 2 | 2 | 2 |
| PCA: P2-segment (n = 3) | 0 | 0 | 0 | 0 | 0 | 0 | 0 | 0 |
| PCA: P3- or P4-segment (n = 8) | 0 | 0 | 0 | 0* | 3 | 3 | 2 | 2 |
| PICA (n = 2) | 1* | 1* | 1* | 0 | 2 | 1 | 2 | 1 |
| SCA (n = 1) | 0 | 0 | 0 | 0 | 0 | 0 | 0 | 0 |

Figure 23

| | with Tmax | | without Tmax | |
|---|---|---|---|---|
| | *Number* | *Causes** | *Number* | *Causes* |
| READER 1: Fellow | 3 | Prolonged Tmax due to a developmental venous anomaly that did not conform to an arterial territory (n=1) Borderzone Tmax delay (n=2) | 15 | Small caliber distal branches and distal branch points |
| READER 2: Scientist | 1 | Motion artifact causing apparent M4-MCA Tmax delay (n=1) | 7 | |
| READER 3: Radiologist | 0 | | 3 | |
| READER 4: Resident | 8 | Prolonged Tmax due to a developmental venous anomaly in the distal ACA territory (n=1) (Figure 4S A-C) Hemispheric Tmax delay, more pronounced in the anterior and posterior external watershed areas, due to hemiplegic migraine (Figure 4S D) Borderzone Tmax delay (n=6) | 10 | |

Figure 24

IDENTIFYING VESSEL OCCLUSIONS USING SPATIAL PATTERNS

PRIORITY CLAIM

This application claims priority to U.S. provisional patent application Ser. No. 63/091,536, filed on Oct. 14, 2020, and entitled "Using Temporal Perfusion Patterns to Localize and Classify Arterial Occlusions", which is incorporated by reference herein in its entirety.

BACKGROUND

Damage can occur to tissue in the human body when blood flow is disrupted to the tissue. Decreased blood flow to tissue can have a number of causes, such as blood vessel blockage, rupture of blood vessels, constriction of blood vessels, or compression of blood vessels. The severity of the damage to the tissue can depend on the extent of the blood flow disruption to the tissue and the amount of time that blood flow to the tissue is disrupted. In situations where blood supply to tissue is inadequate for a prolonged period of time, the tissue may become infarcted. Infarcted tissue can result from the death of cells of the tissue due to the lack of blood supply.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

FIG. 6 includes a first table including patient demographics and location of vessel occlusions with respect to a retrospective study of imaging data.

FIG. 7 includes a second table including readers' diagnostic performance for detection of a DVO on CTA on, with and without $T_{max}$.

FIG. 8 includes a third table including readers' diagnostic performance for detection of a DVO on CTA, with and without $T_{max}$, excluding 22 patients with proximal M2-MCA occlusion, n=118 (48 with a DVO, 70 without a DVO).

FIG. 11 shows examples where $T_{max}$ aided detection of a DVO on CTA including an image A. $T_{max}$ delay>10 seconds is evident in the left MCA superior M2-division territory in a 54-year-old woman who presented with sudden onset aphasia; an image B. Sagittal CTA MIP (selected slice) showing the occlusion (red arrowheads). This was detected by only 2 readers without $T_{max}$ but all 4 readers with $T_{max}$; an image C. Wedge-shaped, territorial $T_{max}$ delay seen in a right parietal lobe in an 83 year-old man; an image D. The right parietal M4 occlusion (red arrow), shown on an axial CTA MIP, was detected by only 2 readers without $T_{max}$ and all 4 readers with $T_{m}$a.

FIG. 16 shows a table including information about patients with DVOs at two sites.

FIG. 17 shows a table including ROC analysis of diagnostic performance for detection of DVOs on CTA, n=140 (70 with a DVO, 70 without a DVO.

FIG. 18 shows a table including ROC analysis of diagnostic performance for detection of DVOs on CTA, excluding patients with proximal M2-MCA occlusion, n=118 (48 with a DVO, 70 without a DVO). The prevalence of DVO in screened population was 48/501 (10%).

FIG. 19 shows a table including ROC analysis of diagnostic performance for detection of DVOs on CTA, excluding patients with M2-MCA and P2-PCA occlusions, n=97 (27 with a DVO, 70 without a DVO). The prevalence of DVO in screened population was 27/501 (5%).

FIG. 20 shows a table including a shift analysis of change in diagnostic confidence with addition of $T_{max}$ to CTA, using Wilcoxon signed-rank test.

FIG. 21 shows a table including time taken (in seconds) to interpret CTA, with and without $T_{max}$.

FIG. 22 shows a table including Time taken (in seconds) to interpret CTA, with and without $T_{max}$, for M2 (n=38) versus M3 and M4 segment (n=13) MCA occlusions.

FIG. 23 shows a table including false negatives for a DVO on CTA, with and without $T_{max}$.

FIG. 24 shows a table including false positives for a DVO on CTA, with and without $T_{max}$.

DETAILED DESCRIPTION

Figure 1:
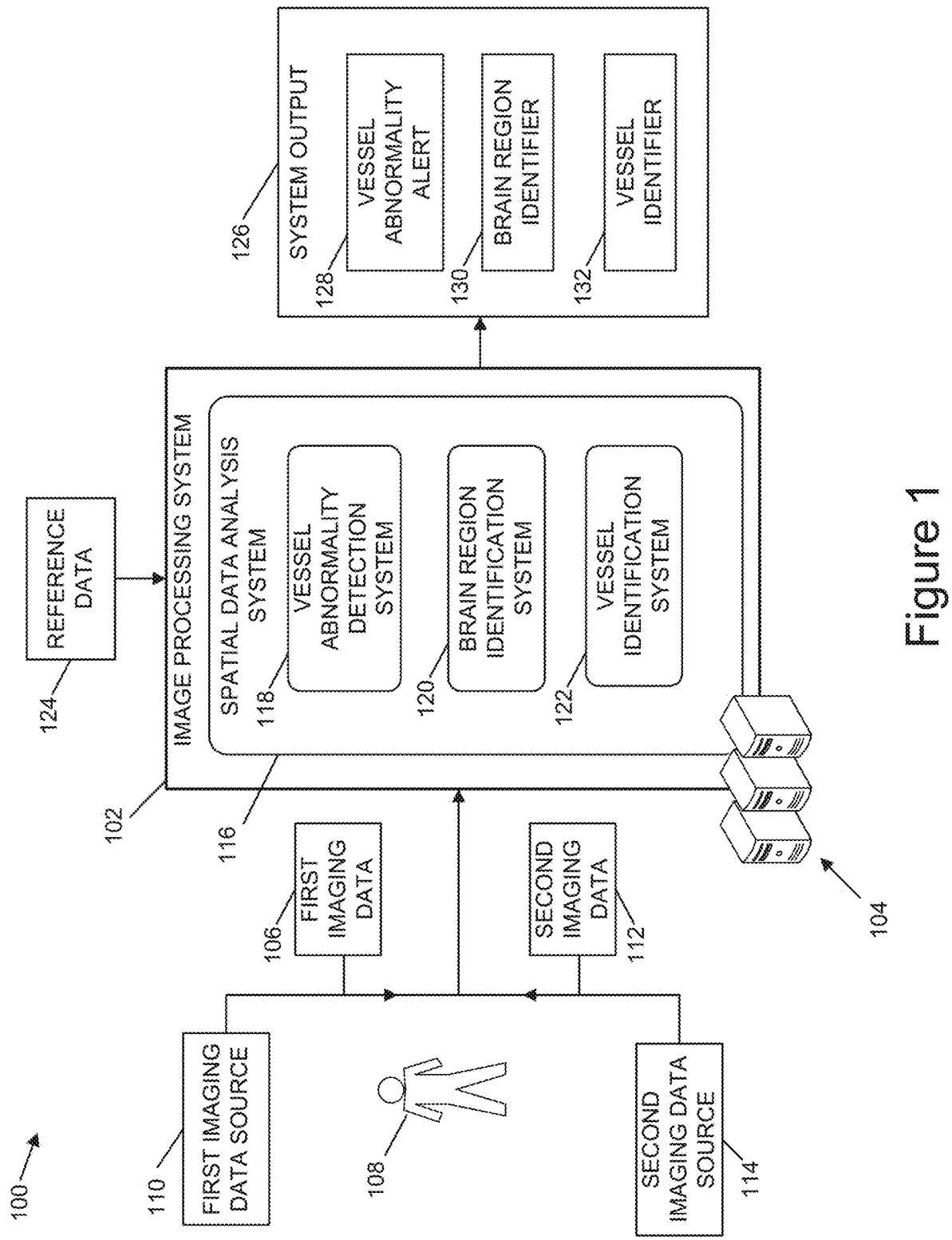
FIG. 1 is a diagrammatic representation of a computational architecture to determine a vessel of the brain in which an abnormality is present, according to one or more example implementations.

Accurately identifying a location of the brain where disruption to the supply of blood has occurred, specifically at which segment/branch of an artery the vessel is occluded, is important in determining treatment to be administered as well as treatment outcome and prognosis. In some instances, a type of treatment used to restore the supply of blood to a region of the brain can depend on the particular location of the cause of the disruption of blood flow to the tissue. Additionally, the speed at which a diagnosis of presence/absence of an occlusion and which vessel segment/branch is involved, can be provided can also impact the type of treatment and the effectiveness of treatment provided to an individual.

In situations where blood flow is disrupted due to a distal vessel occlusion, such as by an occlusion or stenosis, the accuracy of identifying the occlusion can be reduced. As used herein, distal vessel occlusions can refer to blockages of blood vessels that are distal with respect to at least one of the internal carotid artery (ICA), the M1 segment of the middle cerebral artery (MCA), or the vertebral and basilar arteries. Distal vessel occlusions can include the A2 to A5 segments of the anterior cerebral artery, the M2-M4 segments of the middle cerebral artery, the P2 to P4 segments of the posterior cerebral artery, the posterior inferior cerebellar artery, the anterior inferior cerebellar artery, and the superior cerebellar artery. Existing techniques to identify distal vessels in which an abnormality may be present typically rely on data derived from computed tomography angiography imaging techniques. However, abnormalities of distal blood vessels can be difficult to identify using data derived from computed tomography angiography imaging techniques.

In various examples, the decreased accuracy that is characteristic of existing techniques can be the result of distal vessels having smaller diameters than proximal blood vessels of the brain. Additionally, distal blood vessels are present in greater numbers and have decreased opacity on computed tomography angiography images than proximal vessels. Further, distal blood vessels can have greater branch variability than proximal vessels. As a result, the decreased accuracy of the identification of distal blood vessel abnormalities and the increased time needed to identify an occlusion of distal blood vessels can cause the treatment provided to an individual to be delayed or be less effective causing increased damage to the brains of the individuals.

In one or more implementations, imaging data generated by at least one of one or more perfusion-based imaging techniques or one or more diffusion-based imaging techniques can be used to determine a region of a brain of an individual where a vessel abnormality may be present. The perfusion-based imaging techniques can include CT-based perfusion imaging techniques. In addition, the perfusion-based imaging techniques can include magnetic resonance (MR)-based imaging techniques. The diffusion-based imaging techniques can include one or more additional MR-based imaging techniques.

In various examples, values of one or more perfusion parameters can be determined. The values of the one or more perfusion parameters can indicate the presence of a vessel abnormality in a region of a brain of an individual. For example, the perfusion parameters can indicate a distortion in time of arrival of blood to the region of the brain. In various examples, the perfusion parameter can include a time to maximum of a tissue residue function ($T_{max}$) for voxels of images captured using one or more perfusion-based imaging techniques. The values of $T_{max}$ can be analyzed with respect to one or more threshold $T_{max}$ values to determine one or more regions of the brain where blood supply may be disrupted. For example, in situations where $T_{max}$ values of a region of the brain of an individual are at least a threshold value, disruption to blood supply to the region may be present. The threshold values for $T_{max}$ can indicate an amount of delay of supply of a contrast agent to a region of the brain during a perfusion-based imaging process. Additionally, values of mean tracer transit time (MTT) can be determined. MTT can correspond to an average transit time of contrast agent through a region of the brain.

The values of one or more perfusion parameters can be used to render a user interface that indicates values of the one or more perfusion parameters throughout the brains of individuals. In one or more scenarios, the amount of time elapsed before arrival of contrast agent to a portion of the brain can be indicated by a number of different colors. In one or more examples, regions of the brain of an individual where the time of arrival of the contrast agent meets or exceeds a threshold time can be displayed as one or more colors that are contrasted with portions of the brain of an individual where the time of arrival of the contrast agent is less than the threshold time. In this way, a practitioner viewing the user interface can identify a region of the brain of the individual where blood supply may be disrupted. In various examples, a region of the brain of an individual having values of one or more perfusion parameters that meet or exceed a threshold value can be highlighted in the user interface using a geometric shape, arrow, or other indicator.

In at least some cases, perfusion parameters, such as $T_{max}$ and MTT, can provide a more accurate delineation of the area that demonstrates delayed blood arrival/transit which is in turn an indicator of impaired hemodynamics and a surrogate loss of blood flow to a region of the brain than other parameters due to the level of uniformity in the values of the perfusion parameters in brains of individuals in which an abnormality is not present. Thus, images indicating values of one or more perfusion parameters throughout brains of individuals in which an abnormality is present can have an amount of contrast in relation to images of brains of individuals in which an abnormality is not present. As a result of the contrast in a region in which an abnormality is present in relation regions where an abnormality is not present, the regions where an abnormality is present can be easier to identify.

In various examples, a user interface can be generated that indicates the one or more vessels in which an abnormality is present. In one or more illustrative examples, one or more images can be generated using data captured during a CT-angiography imaging process. A user interface can be generated that indicates the blood vessels of the brain of the individual based on the CT-angiography data. Additionally, the user interface can include an indicator of the blood vessel in which an abnormality may be present.

By analyzing images derived from at least one of perfusion-based imaging techniques or diffusion-based imaging techniques to identify regions where a vessel abnormality is present and not simply relying on images derived using CT-angiography imaging techniques, the accuracy of identifying abnormalities with respect to distal vessels can be increased in relation to existing techniques. Increased accuracy with respect to identifying distal vessels in which an abnormality is present can result in providing faster and more effective treatment to individuals, which can lead to a decrease in the amount of brain tissue damaged due to the abnormalities. In particular, by determining a region of the brain of the individual where blood flow is disrupted through an analysis of values of one or more perfusion parameters and/or one or more diffusion parameters, the number of candidate distal vessels where an abnormality may be present is reduced. In this way, the analysis to identify given vessels where an abnormality be present can be focused on vessels supplying blood to the specified region rather than an analysis of vessels included in a larger portion of the brain of the individual. Thus, by reducing the region of the brain being analyzed as well as the number of vessels being analyzed to identify an abnormality causing a disruption to blood flow to a region of the brain, the probability of an abnormal vessel being misidentified or being excluded entirely as a candidate vessel is decreased. Additionally, the amount of time to identify an abnormality in a distal vessel is reduced. Further, the number of computing resources utilized to analyze the reduced number of blood vessels to identify an abnormality can be decreased with respect to existing techniques that analyze a greater number of blood vessels over a larger region of the brain.

FIG. 1 is a diagrammatic representation of a computational architecture 100 to determine a vessel of the brain in which an abnormality is present, according to one or more example implementations. The architecture 100 can include an image processing system 102. The image processing system 102 can be implemented by one or more computing devices 104. The one or more computing devices 104 can include one or more server computing devices, one or more desktop computing devices, one or more laptop computing devices, one or more tablet computing devices, one or more mobile computing devices, or combinations thereof. In certain implementations, at least a portion of the one or more computing devices 104 can be implemented in a distributed computing environment. For example, at least a portion of the one or more computing devices 104 can be implemented in a cloud computing architecture.

The image processing system 102 can obtain first imaging data 106 that is captured with respect to an individual 108. The first imaging data 106 can be captured by a first imaging data source 110. The first imaging source 110 can include an apparatus that utilizes one or more imaging technologies to generate the first imaging data 106. In one or more examples, the first imaging data source 110 can implement computed tomography (CT) imaging techniques. CT imaging techniques implemented by the first imaging data source 110 can include perfusion-based CT imaging techniques. In one or more further examples, the first imaging data source 110 can implement magnetic resonance (MR) imaging techniques. MR imaging techniques implemented by the first imaging data source 110 can include perfusion-based imaging techniques. In situations where the first imaging data source 110 implements CT-based imaging techniques or MR-based imaging techniques, the first imaging data 106 can include thin-slice volumetric data.

When images are taken dynamically during the time that the contrast agent is passing through the large arteries, capillary bed, and draining veins with the intent to derive hemodynamic parameters such as blood flow or blood arrival time in tissue, the technique is called CT perfusion (CTP). The disruption of the flow of contrast agent to a region of the brain can indicate a lack of blood supply to the region of the brain that can result in damage to brain tissue in the region. In one or more examples, the contrast agent can include iodine or gadolinium that is disposed within a carrier solution. Perfusion-based MR imaging techniques that implement a contrast agent can also be used to identify regions of the brain of the individual in which the supply of blood has been disrupted.

Additionally, non-contrast agent-based imaging techniques can be implemented to identify regions of a brain of an individual that may be damaged due to a lack of blood supply. To illustrate, diffusion-based MR imaging techniques can be used to determine portions of a brain of an individual where blood supply has been disrupted and that have consequently been damaged. In at least some examples, the damage to brain tissue may be irreversible. In one or more illustrative examples, diffusion-based MR imaging techniques can be implemented to identify brain tissue that has been damaged due to a lack of blood supply.

The image processing system 102 can also obtain second imaging data 112 that is captured with respect to an individual 108. The second imaging data 112 can be captured by a second imaging data source 114. The first imaging source 110 can include an apparatus that utilizes one or more imaging technologies to generate the first imaging data 106. In one or more examples, the first imaging data source 110 can implement computed tomography (CT) imaging techniques. CT imaging techniques implemented by the first imaging data source 110 can include CT-angiography imaging techniques. In various examples, the second imaging data 112 can include thin-slice volumetric data. In one or more illustrative examples, a contrast agent can be delivered to the individual 108 and CT images can be captured indicating the flow of the contrast agent through blood vessels that supply blood to the brain of the individual 108.

When images are taken while the contrast is still in the arteries this is called a CT Angiography (CTA). CTA imaging techniques can include capturing images of vessels that carry blood to the brain and provide an indication of narrowing or blockage of vessels.

The first imaging data 106 can include one or more data files that included data related to images captured by the first imaging data source 110 and the second imaging data 112 can include one or more data files that include data related to images captured by the second imaging data source 114. In one or more examples, at least one of the first imaging data 106 or the second imaging data 112 can be formatted according to one or more imaging data formats, such as a Digital Imaging and Communication in Medicine (DICOM) format. In one or more additional examples, at least one of the first imaging data 106 or the second imaging data 112 can be formatted according to at least one of a portable network graphics (PNG) format, a joint photographic experts group (JPEG) format, or a high efficient image format (HEIF). The first imaging data 106 and the second imaging data 112 can be rendered by the image processing system 102 to generate one or more images that can be displayed on a display device. In various examples, the first imaging data 106 and the second imaging data 112 can include a series of images of the individual 108. In one or more illustrative examples, the first imaging data 106 and the second imaging data 112 can correspond to one or more features of a head of the individual 108. In one or more scenarios, the first imaging data 106 and the second imaging data 108 can be rendered to show internal features of the head of the individual 108, such as blood vessels or brain tissue located within the head of the individual 108.

The image processing system 102 can include a spatial data analysis system 116. The spatial data analysis system 116 can implement one or more computational models to analyze values of one or more perfusion parameters or values of one or more diffusion parameters generated from the first imaging data 106 to determine a location of an abnormality of a vessel that is causing a disruption to blood flow to a region of the brain of the individual 108. In various examples, the spatial data analysis system 116 can generate one or more images based on values of one or more perfusion parameters or one or more diffusion parameters derived from the first imaging data 106. The one or more images can indicate spatial patterns that correspond to differing values of the one or more perfusion parameters or the one or more diffusion parameters. The spatial patterns can indicate a disruption to blood flow of a region of the brain of the individual 106. In addition, the spatial patterns derived from the first imaging data 106 can be analyzed by the one or more computational models to determine that the spatial patterns correspond to an occlusion of a respective vessel of the brain of the individual 108.

The spatial data analysis system 116 can include a vessel abnormality detection system 118. The vessel abnormality detection system 118 can analyze information included in the first imaging data 106 to determine whether an abnormality is present in a vessel of the brain of the individual 108. In various examples, the vessel abnormality detection system 118 can analyze the intensity values of voxels of the first imaging data 106 with respect to one or more regions of the brain of the individual 108 to determine one or more perfusion parameters. The values of the one or more perfusion parameters can be analyzed to determine the presence or absence of an abnormality with respect to a vessel of the brain of the individual 108. Additionally, the vessel abnormality detection system 118 can analyze intensity values of voxels derived from one or more diffusion-related parameters to determine the presence or absence of an abnormality in a vessel of the brain of the individual 108.

In one or more illustrative examples, the vessel abnormality detection system 118 can analyze intensity information of voxels that correspond to a number of regions of the brain of the individual 108 over a period of time to determine values of one or more perfusion parameters. In one or more examples, the one or more perfusion parameters can include at least one of $T_{max}$. The vessel abnormality detection system 118 can analyze values of the one or more perfusion parameters with respect to one or more threshold values to determine the presence or absence of an abnormality in a vessel of the brain of the individual 108. In scenarios where the vessel abnormality detection system 118 analyzes values of $T_{max}$, threshold values of at least 2 seconds, at least 4 seconds, at least 6 seconds, at least 8 seconds, at least 10 seconds, at least 12 seconds, or at least 14 seconds can be utilized. In various examples, values of $T_{max}$ that satisfy a respective threshold value can be displayed as a color in a user interface showing the values of $T_{max}$. To illustrate, a first voxel having a value of $T_{max}$ that satisfies a first threshold value can be displayed as a first color and a second voxel having a value of $T_{max}$ that satisfies a second threshold value can be displayed as a second color. Further, a tissue damage threshold value can be specified that corresponds to a disruption in blood flow to a region of the brain of the individual 108 that may result in damage to tissue of the brain of the individual 108.

The image processing system 102 can also include a brain region identification system 120 that determines one or more regions of the brain of the individual 108 in which blood flow may be disrupted. The brain region identification system 120 can determine a region of the brain of the individual 108 is disrupted by identifying a group of voxels associated with values of a perfusion parameter that are greater than or equal to a threshold value. In various examples, the brain region identification system 120 can determine that a minimum number of adjacent voxels have a value of a perfusion parameter that meets or exceeds the threshold value to identify a region of the brain of the individual 108 associated with a disruption of blood flow to the region. In one or more illustrative examples, a group of voxels having values of $T_{max}$ that are equal to or greater than the threshold value can indicate a region of the brain of the individual 108 in which the blood supply is disrupted. In various examples, the region can be identified as a region of interest that has at least a minimum threshold probability of having disrupted blood supply.

The brain region identification system 120 can also implement one or more machine learning techniques to determine one or more regions of the brain of the individual 108 having a disrupted blood supply. In one or more examples, the one or more machine learning techniques can be used to determine regions of tissue in the brain of the individual 108 that have at least a threshold probability of having a disrupted blood supply. In one or more examples, one or more convolutional neural networks may be implemented to determine regions in the brains of individuals having a disrupted blood supply. For example, one or more classification convolutional neural networks can be implemented to determine regions of brains of individuals having a disrupted blood supply due to an abnormality in a vessel of the brain of the individual 108.

In one or more illustrative examples, the brain region identification system 120 can obtain a number of CT-perfusion images as training images. The training images can include a first number of images of the brains of first individuals having one or more regions with disrupted blood supply and a second number of images of brains of second individuals that do not include regions with a disrupted blood supply. In one or more scenarios, the first number of images can be classified as having one or more regions with a disrupted blood supply and the second number of images can be classified as not having a region with disrupted blood supply. In images with disrupted blood supply, on the basis of $T_{max}$, the network can classify the likelihood of a specific branch/segment being occluded (or Tmax delay caused by other causes). In one or more examples, the regions classified as having a disrupted blood supply can include a minimum number of voxels having values of $T_{max}$ and/or MTT that are at least a threshold value. Values of parameters of one or more models generated in conjunction with the one or more machine learning techniques can be determined through a training process. After the training process is complete and the one or more models have been validated using an additional set of images, regions of new images can be identified by the brain region identification system 120 as having disrupted blood flow or not using the one or more models.

Further, the image processing system 102 can include a vessel identification system 122. The vessel identification system 122 can determine a vessel in which an abnormality is present that results in a disruption to blood flow to a region of the brain of the individual 108. In one or more examples, the image processing system 102 can obtain reference data 124. The reference data 124 can include mappings between regions of the human brain and vessels that supply blood to the respective regions. In various examples, the vessel identification system 122 can use the reference data 124 to determine a vessel in which an abnormality, such as an occlusion and/or stenosis, is present. In one or more illustrative examples, the brain region identification system 120 can determine a region of interest of the brain of the individual 108 having disrupted blood flow. The vessel identification system 122 can then analyze the region of interest in relation to the reference data 124. To illustrate, the vessel identification system 122 can use the reference data 124 to determine one or more vessels supplying blood to a part of the brain that includes the region of interest. Based on the location of the region of interest within the part of the brain, the vessel identification system 122 can determine a vessel in which an abnormality is present. In various examples, the vessel identification system 122 can determine a vessel of the brain of the individual 108 having at least a threshold probability of having an abnormality causing disrupted blood flow to the region of interest.

In one or more additional examples, the vessel identification system 122 can analyze the second imaging data 112 to determine a vessel in which an abnormality is present. For example, the vessel identification system 122 can analyze the opacity of voxels of the second imaging data 112 to identify a vessel in the brain of the individual 108 having at least a threshold probability of an abnormality being present. In these scenarios, the vessel identification system 122 can utilize the region of interest determined by the brain region identification system 120 to focus an analysis on the portion of the second imaging data 122 that corresponds to the region of interest. In this way, the likelihood of accurately identifying a vessel in which an abnormality increases because a region of interest having at least a threshold probability of having disrupted blood flow has already been identified by the brain region identification system 120. In this way, the probability of the one or more algorithms implemented by the vessel identification system 122 to identify a false positive or a false negative in another region of the brain of the individual 108 decreases because the analysis performed by the vessel identification system 122 corresponds to the region of interest and not to other regions of the brain of the individual 108.

The image processing system 102 can generate system output 126. The system output 126 can include a vessel abnormality alert 128. The vessel abnormality alert 128 can include an audio notification, a visual notification, a text notification, a symbolic notification, a video notification, one or more combinations thereof, and the like indicating that an abnormality is present in a vessel of the brain of the individual 108. The vessel abnormality alert 128 can be provided using one or more output devices of a computing device, such as a display device and/or speakers. The vessel abnormality alert 128 can be generated based on output from the vessel abnormality detection system 118 indicating that an abnormality is present in the brain of the individual 108. In one or more illustrative examples, the vessel abnormality alert 128 can be generated in response to the vessel abnormality detection system 118 determining that at least a threshold number of voxels of one or more images of the first imaging data 106 have at least threshold values for one or more perfusion parameters.

The system output 126 can also include a brain region identifier 130. The brain region identifier 130 can indicate a region of the brain of the individual 108 having a disruption to the supply of blood. In one or more examples, the brain region identifier 130 can be displayed within a user interface. In various examples, the brain region identifier can include an outline of the region of the brain of the individual 108 having a disrupted blood supply. In one or more additional examples, the brain region identifier 130 can include a geometric shape or arrow indicating a region of the brain of the individual 108 having a disrupted supply of blood. In one or more illustrative examples, the brain region identifier 130 can be displayed as an overlay of an image of the brain of the individual 108, where the image is derived from at least one of the first imaging data 106 or the second imaging data 112. To illustrate, the brain region identifier 130 can be displayed as an overlay of a user interface showing values of one or more perfusion parameters derived from the first imaging data 106. Further, the brain region identifier 130 can be displayed as an overlay of a user interface showing blood vessels of the brain of the individual 112 derived from at least one of the first imaging data 106 or the second imaging data 112.

Additionally, the system output 126 can include a vessel identifier 132. The vessel identifier 132 can indicate a vessel of the brain of the individual 108 in which an abnormality is present. The vessel identifier 132 can be displayed as on overlay on an image of the brain of the individual 108 that shows at least a portion of the blood vessels of the brain of the individual 108. In various examples, the vessel identifier 132 can highlight a vessel in which an abnormality is present. In one or more illustrative examples, the vessel identifier 132 can include an arrow indicating the vessel in the brain of the individual 108 in which an abnormality is present.

Figure 2:
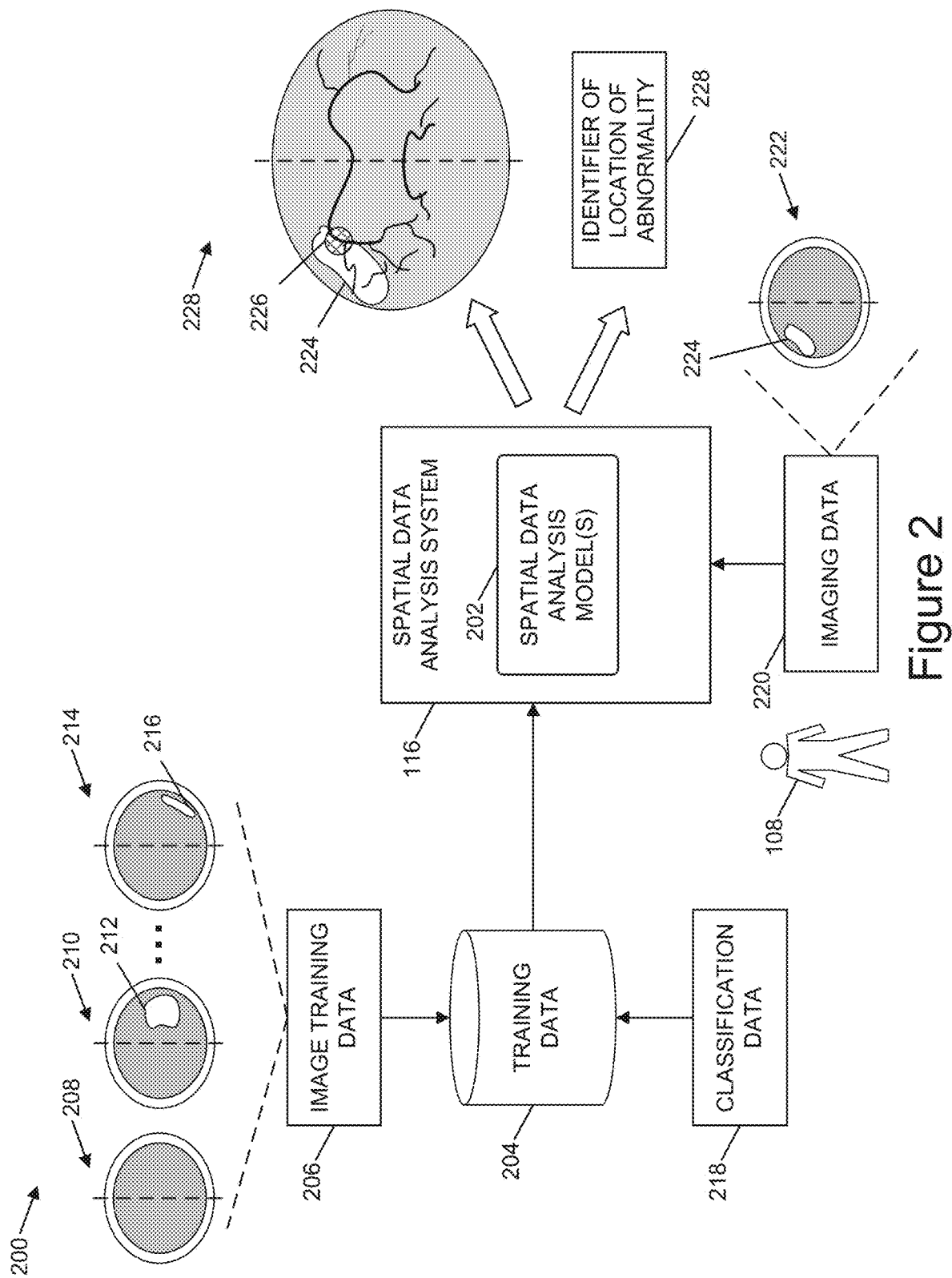
FIG. 2 illustrates a computational architecture 200 to train and implement one or more computational models to analyze spatial patterns derived from imaging data, according to one or more implementations.

FIG. 2 illustrates a computational architecture 200 to train and implement one or more computational models to analyze spatial patterns derived from imaging data, according to one or more implementations. The computational architecture 200 can include one or more spatial data analysis models 202. The one or more spatial data analysis models 202 can implement one or more machine learning techniques to determine an abnormality in the brains of individuals. In various examples, the one or more spatial data analysis models 202 can determine a location of blood vessels in brains of individuals in which an abnormality, such as an occlusion or stenosis, is present. In one or more examples, the one or more spatial data analysis models 202 can identify spatial patterns indicated by values of a perfusion parameter or a diffusion parameter that correspond to abnormalities of one or more blood vessels in the brains of individuals. In one or more illustrative examples, the one or more spatial data analysis models 202 can be implemented in relation to one or more convolutional neural networks.

The one or more spatial data analysis models 202 can be trained using training data 204. The training data 204 can include image training data 206. The image training data 206 can include a number of images that indicate values of a perfusion parameter or values of a diffusion parameter. For example, the image training data 206 can include images that correspond to values of $T_{max}$. Different values of the perfusion parameter or the values of the diffusion parameter can be displayed differently with respect to each other. To illustrate, differing values of the perfusion parameter or the diffusion parameter can be displayed as different colors. As the values of the perfusion parameter or the diffusion parameter vary, the colors displayed in the training images can also vary. Accordingly, differing values of the perfusion parameter or the diffusion parameter can result in patterns that are present in the training images. The presence of an abnormality of a vessel in the brains of individuals can generate respective patterns of values of the perfusion parameter or the diffusion parameter. In one or more illustrative examples, abnormalities of a vessel located in a first location of the human brain can result in a first pattern of values of the perfusion parameter or the diffusion parameter. Additionally, abnormalities of an additional vessel located in a second location of the human brain can result in a second pattern of values of the perfusion parameter or the diffusion parameter that is different from the first pattern. The image training data 206 can be used to train the one or more spatial data analysis models 202 to recognize different patterns of values of a perfusion parameter or a diffusion parameter that correspond to abnormalities of vessels located in different locations of the human brain.

In one or more implementations, the one or more spatial data analysis models can be trained by providing pairs of images and verbal labels for each image. The labels can indicate where the most proximal site of arterial occlusion/stenosis are located. For example, the labels can indicate that the abnormality is located in proximal ICA, distal ICA, M1-MCA, M2-MCA, M3-MCA, M4-MCA, Vertebral Artery. Basilar Artery, P1-PCA, P2-PCA, . . . , A1-ACA, A2-ACA, . . . SCA, AICA, PICA. After training, the one or more spatial data analysis models 202 can infer on de novo, previously not trained perfusion or diffusion studies which arterial segment, branch is occluded and outputs the segment/branch name and likelihood of a possible abnormality or common variant (e.g., fetal PCA).

In the illustrative example of FIG. 2, the image training data 206 can include a first image 208. The first image 208 can correspond to values of a perfusion parameter or a diffusion parameter of individuals in which an abnormality of a vessel of the brain is absent. In these situations, an amount of contrast between voxels included in the first image 208 can be less than a threshold amount of contrast. Additionally, the image training data 206 can include a second image 210. The second image 210 can include a region 212 having voxels that have at least a threshold amount of contrast with other regions of the brain. The region 212 can indicate voxels that correspond to values of the perfusion parameter or the diffusion parameter that have at least a threshold value. The presence of the region 212 can indicate an abnormality with respect to a first vessel of the human brain. Further, the image training data 206 can include a third image 214. The third image 214 can include an additional region 214 that is different from the region 212. The additional region 214 can also indicate voxels having at least a threshold amount of contrast with other regions of the brain. In one or more examples, the additional region 216 can indicate voxels that correspond to values of the perfusion parameter or the diffusion parameter that have at least a threshold value. The presence of the additional region 216 can indicate an abnormality with respect to a second vessel of the human brain that has a location that is different from the first vessel that corresponds to the region 212. The image training data 206 can include hundreds, up to thousands, up to tens of thousands or more images that correspond to abnormalities in individual vessels located in respective locations of the human brain.

The training data 204 can also include classification data 218. The classification data 218 can indicate images included in the image training data 206 that correspond to abnormalities in respective vessels of the human brain. For example, the classification data 218 can label the first image 208 and other images included in the image training data 206 having similar voxel values as being associated with no vessel abnormalities. Additionally, the classification data 218 can label the second image 210 and other images included in the image training data 206 having regions similar to that of region 212 as being associated with an abnormality in the first vessel. Further, the classification data 218 can label the third image 214 and other images included in the image training data 206 having regions similar to that of the additional region 216 as being associated with an abnormality in the second vessel.

After the one or more spatial data analysis models 202 are trained, the spatial data analysis system 116 can access imaging data 220 of the individual 108. The image data 220 can be generated in response to one or more perfusion-based imaging techniques or one or more diffusion-based imaging techniques that capture images of the brain of the individual 108. The imaging data 220 can include an image 222. The image 222 can be derived from values of one or more perfusion parameters or values of one or more diffusion parameters. The image 222 can include a region 224 that has at least an amount of contrast with respect to other regions of the image 222. The region 224 can indicate disruption to blood flow to the region 224. In various examples, the region 224 can correspond to values of one or more perfusion parameters or one or more diffusion parameters having at least a threshold value.

The one or more spatial data analysis models 202 can analyze the image 222 to determine a likelihood that the image 222 corresponds to one or more sets of images included in the image training data 206. In various examples, the one or more spatial data analysis models 202 can determine a likelihood that the image 222 corresponds to an abnormality associated with a given vessel. In situations where the one or more spatial data analysis models 202 determine that the image 222 has at least a threshold likelihood of corresponding to an abnormality of a vessel that supplies blood to a region of the brain of the individual 108 that is similar to the region 224, the spatial data analysis system 116 can generate an additional image 228. The additional image 228 can indicate the region 224 and also indicate a location 226 of a vessel in which an abnormality is present. In one or more additional examples, the spatial data analysis system 116 can alternatively, or additionally, generate a text-based identifier of location abnormality 228. The identifier of location abnormality 228 can indicate an identifier of a vessel where an abnormality is present, such as M3-MCA, P2-PCA, and so forth.

Figure 3:
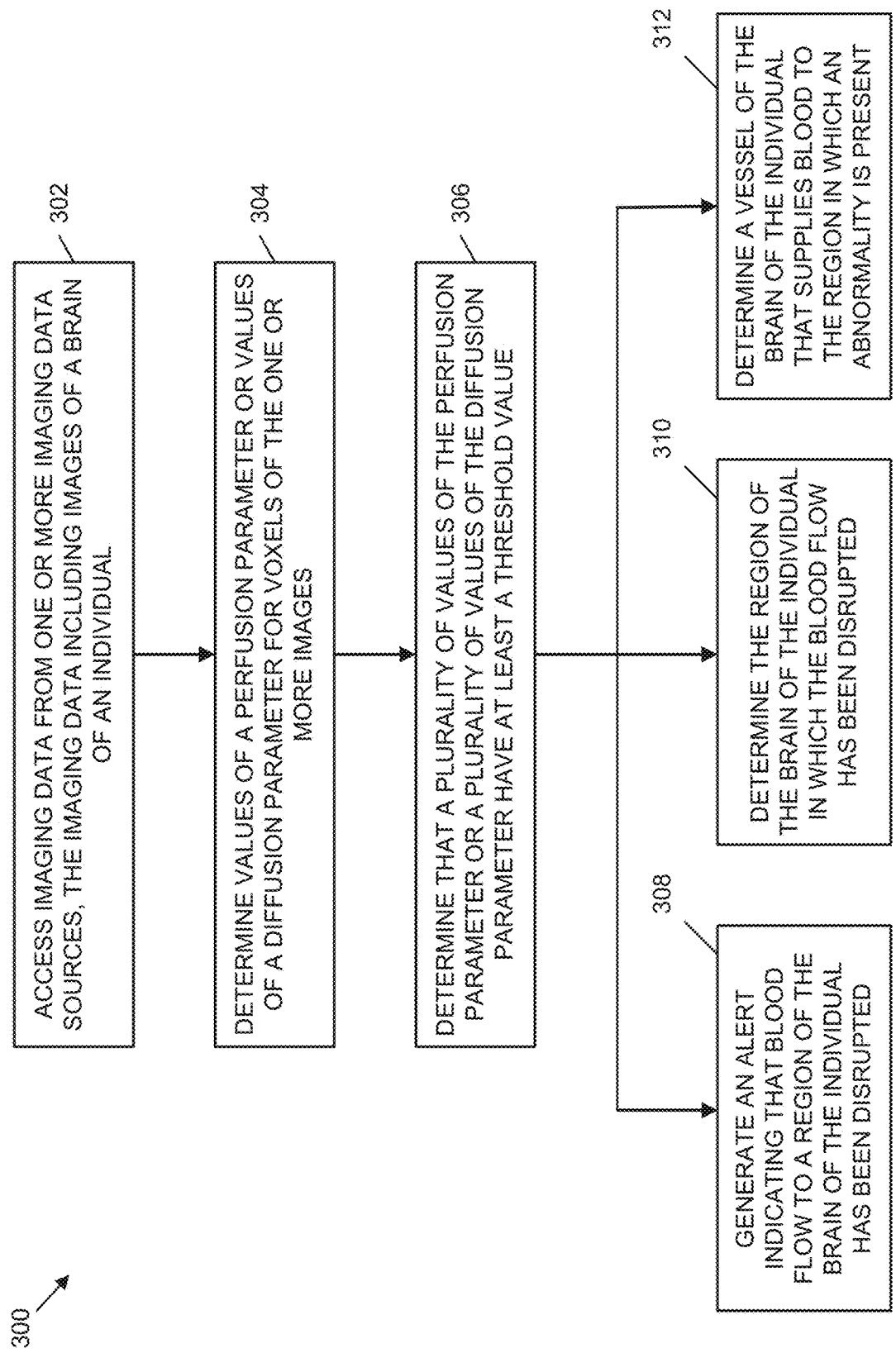
FIG. 3 is a flow diagram of a process to determine a vessel of the brain in which an abnormality is present, according to one or more example implementations.

In situations where the one or more spatial data analysis models 202 determine that a likelihood of the image 222 corresponding to a vessel abnormality is less than a threshold likelihood, the spatial data analysis system 116 can provide an indication of another cause of the presence of the region 224 in the image 222. For example, the one or more spatial data analysis models 202 can determine that the image 222 corresponds to a variant of a blood vessel in the brain of the individual 108. Additionally, the one or more spatial data analysis models 202 can determine that the image 222 corresponds to a tumor being present in the brain of the individual 108 or determine that the individual 108 is experiencing a migraine or a seizure. In scenarios where the one or more spatial data analysis models 202 determine that there is less than a threshold likelihood of the image 222 corresponding to a brain vessel abnormality, the spatial data analysis system 116 can analyze images derived from additional parameters to classify the image 222. To illustrate, the one or more spatial data analysis models 202 can analyze images that indicate values of $T_{max}$ to determine a likelihood of the image 222 corresponding to a brain vessel abnormality and then use images derived from values of cerebral blood volume and/or cerebral blood flow to determine a condition that produces the spatial pattern shown in the image 222. FIG. 3 illustrates a flowchart of a process to determine a vessel of the brain in which an abnormality is present. The process may be embodied in computer-readable instructions for execution by one or more processors such that the operations of the processes may be performed in part or in whole by the functional components of the image processing system 102. Accordingly, the process described below is by way of example with reference thereto, in some situations. However, in other implementations, at least some of the operations of the process described with respect to FIG. 2 may be deployed on various other hardware configurations. The process described with respect to FIG. 2 is therefore not intended to be limited to the image processing system 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 3 is a flow diagram of a process 300 to determine a vessel of the brain in which an abnormality is present, according to one or more example implementations. At operation 302, the process 300 can include obtaining imaging data from one or more imaging data sources. The imaging data can include images of a brain of an individual. In one or more examples, the one or more imaging data sources can include one or more perfusion-based imaging systems. In one or more additional examples, the one or more imaging data sources can include one or more diffusion-based imaging system. In one or more additional examples, the one or more imaging data sources can include one or more perfusion-based imaging systems and one or more diffusion-based imaging systems. The one or more perfusion-based imaging systems can include a CT perfusion imaging system. Additionally, the one or more perfusion-based imaging systems can include an MR perfusion imaging system. Further, the one or more diffusion-based imaging systems can include an MR diffusion imaging system.

The process 300 can include, at operation 304, determining values of a perfusion parameter or values of a diffusion parameter for voxels of the one or more images. In one or more examples, the values of the perfusion parameter or the values of the diffusion parameter can be determined by a system that incorporates one or more deconvolution imaging processing techniques. In one or more illustrate examples, the perfusion parameter can include $T_{max}$. In one or more additional illustrative examples, the perfusion parameter can include mean tracer transit time.

Additionally, at operation 306, the process 300 can include determining that a plurality of values of the perfusion parameter or a plurality of values of the diffusion parameter have at least a threshold value. In various examples, the threshold value can indicate the disruption of blood flow to a portion of the brain of the individual that corresponds to the respective voxels associated with the plurality of values. In one or more examples, the threshold value can correspond to an amount of delay for blood to reach a region of the brain of the individual.

Based on the plurality of values of the perfusion parameter or the plurality of values of the diffusion parameter having at least the threshold value, the process 300 can proceed to at least one of operations 308, 310, or 312. At operation 308, an alert can be generated indicating that blood flow to a region of the brain of the individual has been disrupted. The alert can include at least one of a visual alert or an audio alert. The alert can be provided to a healthcare practitioner via a computing device and/or a display device.

At operation 310, a region of the brain of the individual in which blood flow has been disrupted can be determined. In one or more examples, the region can correspond to the voxels of the one or more images that have one or more perfusion parameters or one or more diffusion parameters with values greater than the threshold value. The region can be indicated on one or more user interfaces. In various examples, an overlay can show the region on an image of the brain of the individual showing blood vessels of the brain of the individual. In one or more illustrative examples, the image of the brain of the individual showing the blood vessels of the brain of the individual can be generated using data obtained from a CT-angiography system.

Further, at operation 312, a vessel of the brain of the individual that supplies blood to the region in which an abnormality is present can be determined. In one or more implementations, the vessel can be determined by analyzing reference data that indicates one or more vessels that supply blood to a part of the brain that includes the region of interest. The vessel can be determined based on the location of the region of interest in relation to the vessel or vessels that supply blood to the region of interest. In various examples, the opacity of voxels that correspond to blood vessels located in the region can be analyzed to determine the vessel in which an abnormality is present.

In view of the disclosure above, various aspects are set forth below. It should be noted that one or more features of an example, taken in isolation or combination, should be considered within the disclosure of this application.

Aspect 1. A method comprising: accessing, by a computing system including one or more processing devices and one or more memory devices, first training data that includes a first plurality of images of brains of individual, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present; accessing, by the computing system, second training data that includes a second plurality of images of brains of individual, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present; generating, by the computing system, one or more computational models based on the first training data and the second training data, the one or more computational models to identify abnormalities present in vessels of brains of individuals; accessing, by the computing system, one or more additional images of a brain of an individual, the one or more additional images being captured using a perfusion-based imaging technique or a diffusion-based imaging technique; determining, by the computing system, one or more patterns of the one or more perfusion parameters or the one or more diffusion parameters included in the one or more additional images; analyzing, by the computing system and using the one or more computational models, the one or more patterns in relation to the first plurality of patterns and the second plurality of patterns to determine a measure of likelihood that an abnormality is present in the brain of the individual; and generating, by the computing system and based on the measure of likelihood, a user interface that includes an indication that an abnormality is present in the brain of the individual.

Aspect 2. The method of aspect 1, comprising: determining values of a perfusion parameter that indicate a time to maximum of a tissue residue function for a voxel of the one or more images.

Aspect 3. The method of aspect 2, comprising: performing, by the computing system, one or more deconvolution operations with respect to contrast agent concentration curves of voxels included in the one or more images with respect to an arterial input function to generate the tissue residue function.

Aspect 4. The method of any one of aspects 1-3, comprising: determining values of a perfusion parameter that indicate an average transit time of contrast agent through a region of the brain.

Aspect 5. The method of any one of aspects 1-4, wherein the one or more additional images indicate the values of the perfusion parameter or the values of the diffusion parameter in a plurality of regions of the brain of the individual.

Aspect 6. The method of any one of aspects 1-5, wherein the first training data includes classification data that labels the first plurality of images as being obtained from the first individuals in which an abnormality is not present and that labels the second plurality of images as being obtained from the second individuals in which an abnormality is present in vessels of the brains of the second individuals.

Aspect 7. The method of any one of aspects 1-6, wherein the second training data includes one or more first additional images that correspond to an abnormality of a first vessel that disrupts blood flow to a first region of the human brain and one or more second additional images that correspond to an abnormality of a second vessel that disrupts blood flow to a second region of the human brain, the first vessel having a different location from the second vessel in the human brain.

Aspect 8. The method of aspect 7, wherein the second training data includes first additional classification data that labels the one or more first additional images as being associated with an abnormality of the first vessel and second additional classification data that labels the one or more second additional images as being associated with an abnormality of the second vessel.

Aspect 9. The method of any one of aspects 1-8, comprising: training, by the computing system and using the first training data and the second training data, one or more convolutional neural networks to identify when an abnormality is present in brains of individuals based on patterns included in images derived from one or more perfusion-based imaging techniques or one or more diffusion-based imaging techniques.

Aspect 10. The method of any one of aspects 1-9, wherein the one or more perfusion-based imaging techniques include a computed tomography perfusion-based imaging technique or a magnetic resonance perfusion-based imaging technique.

Aspect 11. The method of any one of aspects 1-10, comprising: generating, by the computing system and based on the likelihood of the abnormality being present in the brain of the individual, a text-based identifier of a vessel in which the abnormality is present.

Aspect 12. The method of any one of aspects 1-11, wherein the abnormality is present in a vessel in the brain of the individual in which the abnormality is present is a distal vessel of the human brain, the distal vessel comprising at least one of A2 to A5 segments of the anterior cerebral artery, M2-M4 segments of the middle cerebral artery. P2 to P4 segments of the posterior cerebral artery, posterior inferior cerebellar artery, anterior inferior cerebellar artery, or superior cerebellar artery.

Aspect 13. A system comprising: one or more hardware processors; and one or more non-transitory computer-readable storage media including computer-readable instructions that, when executed by the one or more hardware processors, cause the one or more hardware processors to perform operations comprising: accessing first training data that includes a first plurality of images of brains of individual, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present; accessing second training data that includes a second plurality of images of brains of individual, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present: generating one or more computational models based on the first training data and the second training data, the one or more computational models to identify abnormalities present in vessels of brains of individuals; accessing one or more additional images of a brain of an individual, the one or more additional images being captured using a perfusion-based imaging technique or a diffusion-based imaging technique; determining one or more patterns of the one or more perfusion parameters or the one or more diffusion parameters included in the one or more additional images; analyzing, using the one or more computational models, the one or more patterns in relation to the first plurality of patterns and the second plurality of patterns to determine a measure of likelihood that an abnormality is present in the brain of the individual; and generating, based on the measure of likelihood, a user interface that includes an indication that an abnormality is present in the brain of the individual.

Aspect 14. The system of aspect 13, wherein the one or more non-transitory computer-readable storage media include additional computer-readable instructions that, when executed by the one or more hardware processors, cause the one or more hardware processors to perform additional operations comprising: obtaining additional imaging data that corresponds to one or more additional images captured using a computed tomography angiography imaging technique; determining a portion of the additional imaging data that corresponds to the region of the brain of the individual in which the abnormality is present; analyzing the portion of the additional imaging data to determine a vessel that supplies blood to the region; and determining that the abnormality is present in the vessel.

Aspect 15. The system of aspect 14, wherein the one or more non-transitory computer-readable storage media include additional computer-readable instructions that, when executed by the one or more hardware processors, cause the one or more hardware processors to perform additional operations comprising: determining, based on the additional imaging data, intensity values of voxels that correspond to a plurality of candidate vessels that supply blood to the region of the brain of the individual, wherein the vessel is included in the plurality of candidate vessels; and determining, based on the intensity values, that the abnormality is present in the vessel.

Aspect 16. The system of any one of aspects 13-15, wherein the one or more non-transitory computer-readable storage media include additional computer-readable instructions that, when executed by the one or more hardware processors, cause the one or more hardware processors to perform additional operations comprising: determining a region of the brain of the individual that corresponds to voxels having values of the perfusion parameter or values of the diffusion parameter that have at least the threshold value.

Aspect 17. One or more non-transitory computer-readable media storing computer readable instructions that, when executed by one or more processing devices, cause the one or more processing devices to perform operations comprising: accessing first training data that includes a first plurality of images of brains of individual, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present; accessing second training data that includes a second plurality of images of brains of individual, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present; generating one or more computational models based on the first training data and the second training data, the one or more computational models to identify abnormalities present in vessels of brains of individuals; accessing one or more additional images of a brain of an individual, the one or more additional images being captured using a perfusion-based imaging technique or a diffusion-based imaging technique; determining one or more patterns of the one or more perfusion parameters or the one or more diffusion parameters included in the one or more additional images; analyzing, using the one or more computational models, the one or more patterns in relation to the first plurality of patterns and the second plurality of patterns to determine a measure of likelihood that an abnormality is present in the brain of the individual; and generating, based on the measure of likelihood, a user interface that includes an indication that an abnormality is present in the brain of the individual.

Aspect 18. The one or more non-transitory computer-readable media of aspect 17, wherein operations comprise: generating user interface data that corresponds to a user interface indicating values of the perfusion parameter with respect to voxels of the imaging data; wherein a first range of values of the perfusion parameter are displayed as a first color in the user interface and a second range of values of the perfusion parameter are displayed as a second color in the user interface.

Aspect 19. The one or more non-transitory computer-readable media of aspect 18, wherein the operations comprise: generating additional user interface data that corresponds to an additional user interface indicating intensity values of voxels, the additional user interface indicating vessels of the brain of the individual, wherein a portion of the voxels that correspond to the vessels of the brain of the individual have greater intensity values than additional voxels.

Figure 4:
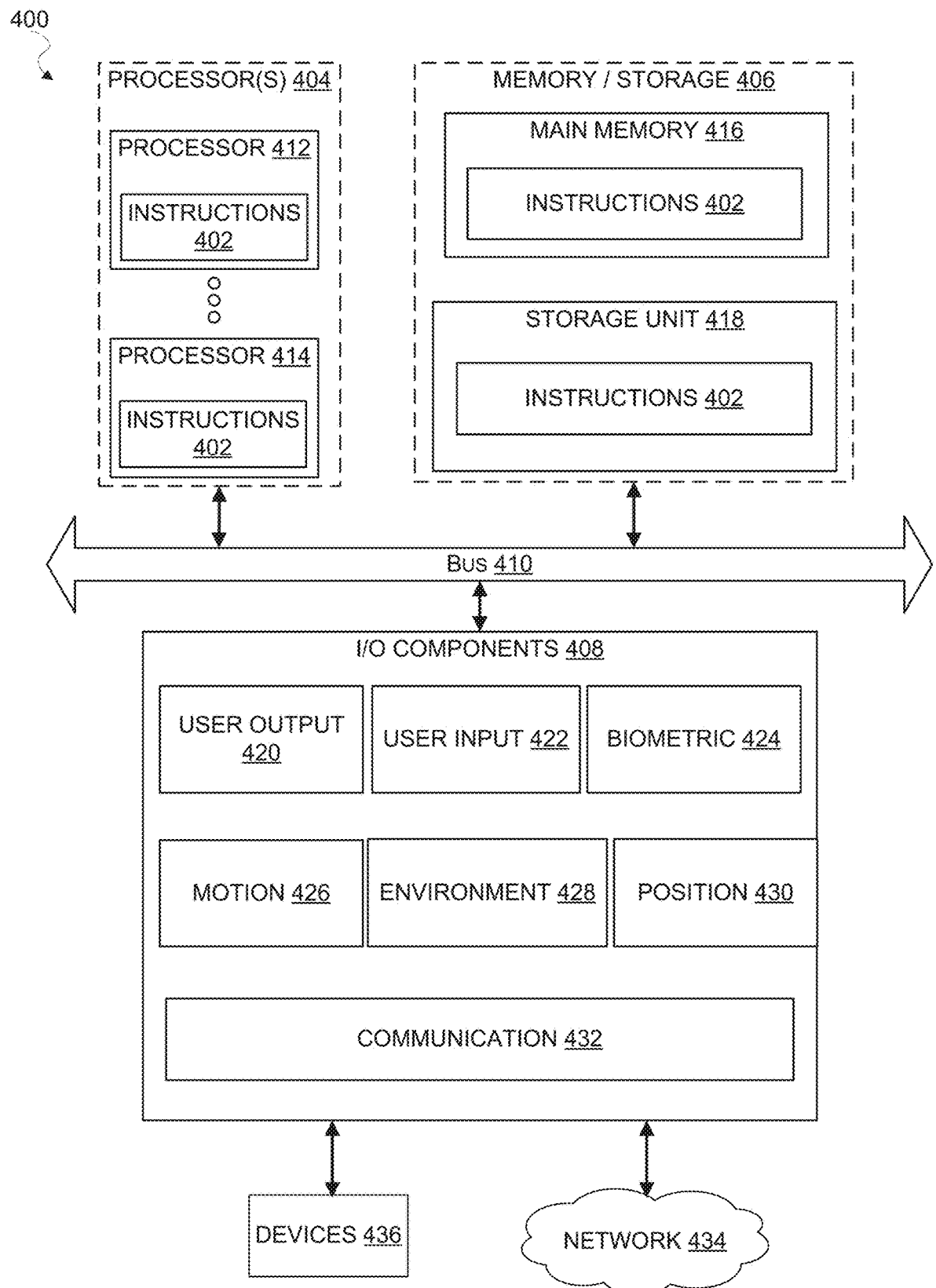
FIG. 4 is a block diagram illustrating components of a machine, in the form of a computer system, that may read and execute instructions from one or more machine-readable media to perform any one or more methodologies described herein, in accordance with one or more example implementations.

Aspect 20. The one or more non-transitory computer-readable media of aspect 19, wherein the first user interface and the second user interface are displayed together; wherein the first user interface data and the second user interface data are configured to be rendered to generate a combined user interface that includes the first user interface and the second user interface and wherein the region of the brain of the individual is highlighted in the user interface: and highlighted in the additional user interface FIG. 4 is a block diagram illustrating components of a machine 400, according to some example implementations, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 402 (e.g., software, a program, an application, an applet, an app, or other executable code) for causing the machine 400 to perform any one or more of the methodologies discussed herein may be executed. As such, the instructions 402 may be used to implement modules or components described herein. The instructions 402 transform the general, non-programmed machine 400 into a particular machine 400 programmed to carry out the described and illustrated functions in the manner described. In alternative implementations, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, at network switch, a network bridge, or any machine capable of executing the instructions 402, sequentially or otherwise, that specify actions to be taken by machine 400. Further, while only a single machine 400 is illustrated, the term "machine" shall also be taken to include a collection of machines that individually or jointly execute the instructions 402 to perform any one or more of the methodologies discussed herein.

The machine 400 may include processors 404, memory/storage 406, and I/O components 408, which may be configured to communicate with each other such as via a bus 410. "Processor" in this context, refers to any circuit or virtual circuit (a physical circuit emulated by logic executing on an actual processor 404) that manipulates data values according to control signals (e.g., "commands," "op codes," "machine code," etc.) and which produces corresponding output signals that are applied to operate a machine 400. In an example implementation, the processors 404 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 402. The term "processor" is intended to include multi-core processors 404 that may comprise two or more independent processors (sometimes referred to as "cores") that may execute instructions 402 contemporaneously. Although FIG. 4 shows multiple processors 404, the machine 400 may include a single processor 412 with a single core, a single processor 412 with multiple cores (e.g., a multi-core processor), multiple processors 412, 414 with a single core, multiple processors 412, 414 with multiple cores, or any combination thereof.

The memory/storage 406 may include memory, such as a main memory 416, or other memory storage, and a storage unit 418, both accessible to the processors 404 such as via the bus 410. The storage unit 418 and main memory 416 store the instructions 402 embodying any one or more of the methodologies or functions described herein. The instructions 402 may also reside, completely or partially, within the main memory 416, within the storage unit 418, within at least one of the processors 404 (e.g., within the processor's cache memory), or any suitable combination thereof, during execution thereof by the machine 400. Accordingly, the main memory 416, the storage unit 418, and the memory of processors 404 are examples of machine-readable media. "Machine-readable media," also referred to herein as "computer-readable storage media", in this context, refers to a component, device, or other tangible media able to store instructions 402 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 402. The term "machine-readable medium" shall also be taken to include any medium, or combination of multiple media, that is capable of storing instructions 402 (e.g., code) for execution by a machine 400, such that the instructions 402, when executed by one or more processors 404 of the machine 400, cause the machine 400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 408 may include a wide variety of components to receive input, provide output, produce output, transmit information, exchange information, capture measurements, and so on. The specific I/O components 408 that are included in a particular machine 400 will depend on the type of machine. For example, portable machines such as mobile phones will likely include a touch input device or other such input mechanisms, while a headless server machine will likely not include such a touch input device. It will be appreciated that the I/O components 408 may include many other components that are not shown in FIG. 4. The I/O components 408 are grouped according to functionality merely for simplifying the following discussion and the grouping is in no way limiting. In various example implementations, the I/O components 408 may include user output components 420 and user input components 422. The user output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 422 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 408 may include biometric components 424, motion components 426, environmental components 428, or position components 430 among a wide array of other components. For example, the biometric components 424 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 426 may include acceleration sensor components (e.g., accelerometer), gravitation sensor components, rotation sensor components (e.g., gyroscope), and so forth. The environmental components 428 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 430 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 may include communication components 432 operable to couple the machine 400 to a network 434 or devices 436. For example, the communication components 432 may include a network interface component or other suitable device to interface with the network 434. In further examples, communication components 432 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 436 may be another machine 400 or any of a wide variety of peripheral devices (e.g., a peripheral device coupled via a USB).

Moreover, the communication components 432 may detect identifiers or include components operable to detect identifiers. For example, the communication components 432 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph. MaxiCode, PDF417. Ultra Code, UCC RSS-2D bar code, and other optical codes), or acoustic detection components (e.g., microphones to identify tagged audio signals). In addition, a variety of information may be derived via the communication components 432, such as location via Internet Protocol (IP) geo-location, location via Wi-Fi® signal triangulation, location via detecting an NFC beacon signal that may indicate a particular location, and so forth.

"Component," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 404 or other programmable processor. Once configured by such software, hardware components become specific machines (or specific components of a machine 400) uniquely tailored to perform the configured functions and are no longer general-purpose processors 404. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 404 configured by software to become a special-purpose processor, the general-purpose processor 404 may be configured as respectively different special-purpose processors (e.g., comprising different hardware components) at different times. Software accordingly configures a particular processor 412, 414 or processors 404, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 404 that are temporarily configured (e.g., by software) or permanently configured to perform the relevant operations. Whether temporarily or permanently configured, such processors 404 may constitute processor-implemented components that operate to perform one or more operations or functions described herein. As used herein, "processor-implemented component" refers to a hardware component implemented using one or more processors 404. Similarly, the methods described herein may be at least partially processor-implemented, with a particular processor 412, 414 or processors 404 being an example of hardware. For example, at least some of the operations of a method may be performed by one or more processors 404 or processor-implemented components. Moreover, the one or more processors 404 may also operate to support performance of the relevant operations in a "cloud computing" environment or as a "software as a service" (SaaS). For example, at least some of the operations may be performed by a group of computers (as examples of machines 400 including processors 404), with these operations being accessible via a network 434 (e.g., the Internet) and via one or more appropriate interfaces (e.g., an API). The performance of certain of the operations may be distributed among the processors, not only residing within a single machine 400, but deployed across a number of machines. In some example implementations, the processors 404 or processor-implemented components may be located in a single geographic location (e.g., within a home environment, an office environment, or a server farm). In other example implementations, the processors 404 or processor-implemented components may be distributed across a number of geographic locations.

Figure 5:
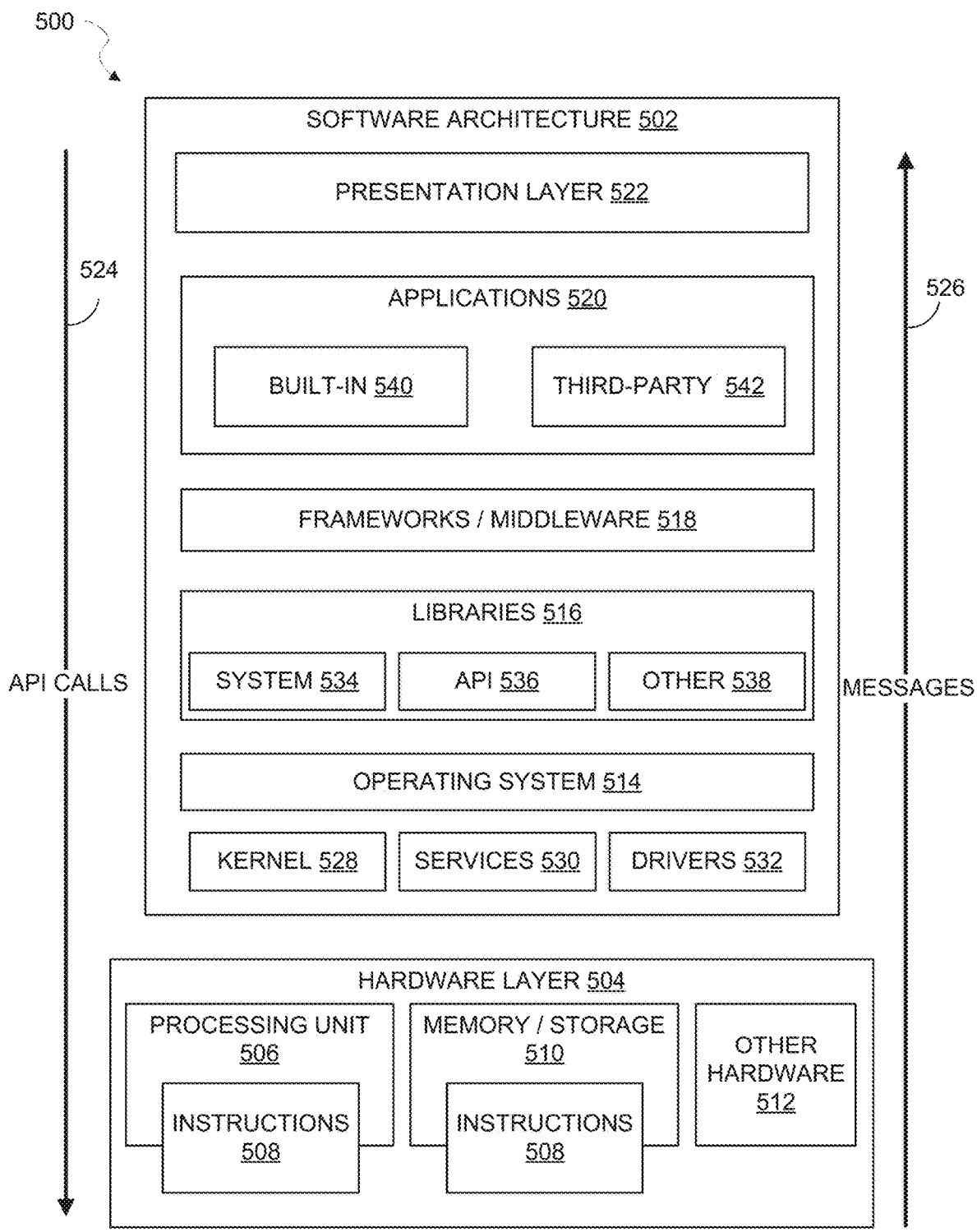
FIG. 5 is block diagram illustrating a representative software architecture that may be used in conjunction with one or more hardware architectures described herein, in accordance with one or more example implementations.

FIG. 5 is a block diagram illustrating system 500 that includes an example software architecture 502, which may be used in conjunction with various hardware architectures herein described. FIG. 5 is a non-limiting example of a software architecture and it will be appreciated that many other architectures may be implemented to facilitate the functionality described herein. The software architecture 502 may execute on hardware such as machine 400 of FIG. 4 that includes, among other things, processors 404, memory/storage 406, and input/output (I/O) components 408. A representative hardware layer 504 is illustrated and can represent, for example, the machine 400 of FIG. 4. The representative hardware layer 504 includes a processing unit 506 having associated executable instructions 508. Executable instructions 508 represent the executable instructions of the software architecture 502, including implementation of the methods, components, and so forth described herein. The hardware layer 504 also includes at least one of memory or storage modules memory/storage 510, which also have executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 522. Operationally, the applications 520 or other components within the layers may invoke API calls 524 through the software stack and receive messages 526 in response to the API calls 524. The layers illustrated are representative in nature and not all software architectures have all layers. For example, some mobile or special purpose operating systems may not provide a frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 are responsible for controlling or interfacing with the underlying hardware. For instance, the drivers 532 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 provide a common infrastructure that is used by at least one of the applications 520, other components, or layers. The libraries 516 provide functionality that allows other software components to perform tasks in an easier fashion than to interface directly with the underlying operating system 514 functionality (e.g., kernel 528, services 530, drivers 532). The libraries 516 may include system libraries 534 (e.g., C standard library) that may provide functions such as memory allocation functions, string manipulation functions, mathematical functions, and the like. In addition, the libraries 516 may include API libraries 536 such as media libraries (e.g., libraries to support presentation and manipulation of various media format such as MPEG4. H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks/middleware 518 (also sometimes referred to as middleware) provide a higher-level common infrastructure that may be used by the applications 520 or other software components/modules. For example, the frameworks/middleware 518 may provide various graphical user interface functions, high-level resource management, high-level location services, and so forth. The frameworks/middleware 518 may provide a broad spectrum of other APIs that may be utilized by the applications 520 or other software components/modules, some of which may be specific to a particular operating system 514 or platform.

The applications 520 include built-in applications 540 and third-party applications 542. Examples of representative built-in applications 540 may include, but are not limited to, a contacts application, a browser application, a book reader application, a location application, a media application, a messaging application, or a game application. Third-party applications 542 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 542 may invoke the API calls 524 provided by the mobile operating system (such as operating system 514) to facilitate functionality described herein.

The applications 520 may use built-in operating system functions (e.g., kernel 528, services 530, drivers 532), libraries 516, and frameworks/middleware 518 to create UIs to interact with users of the system. Alternatively, or additionally, in some systems, interactions with a user may occur through a presentation layer, such as presentation layer 522. In these systems, the application/component "logic" can be separated from the aspects of the application/component that interact with a user.

Changes and modifications may be made to the disclosed implementations without departing from the scope of the present disclosure. These and other changes or modifications are intended to be included within the scope of the present disclosure, as expressed in the following claims.

EXAMPLES

Example 1

Background and Purpose

Detecting intracranial distal arterial occlusions on CTA is challenging but increasingly relevant to clinical decision-making. Our purpose was to determine whether use of CTP-derived time to maximum of the tissue residue function ($T_{max}$) maps improve diagnostic performance for detecting these occlusions.

Materials and Methods 70 consecutive patients with a distal arterial occlusion and 70 randomly selected controls who underwent multimodal CT with CTA and CTP for a suspected acute ischemic stroke were included in this retrospective study. Four readers with different levels of experience independently read the CTAs in two separate sessions, with and without Tmax maps, recording the presence or absence of an occlusion, diagnostic confidence and interpretation time. Accuracy for detecting distal occlusions was assessed using receiver operating characteristic (ROC) analysis, and areas-under-the-ROC-curves (AUCs) were compared to assess whether accuracy improved with use of Tmax. Change in diagnostic confidence and interpretation time were assessed using the Wilcoxon signed-rank test.

Results

Mean sensitivity for detecting occlusions on CTA increased from 70.7% to 90.4% with use of $T_{max}$ maps. Diagnostic accuracy improved significantly for the four readers (p<0.001), with AUC increasing by 0.186, 0.136, 0.114 and 0.121, respectively. Diagnostic confidence and speed also significantly increased.

Conclusion

All assessed metrics of diagnostic performance for detecting distal arterial occlusions improved with use of Tmax maps, encouraging their use to aid interpretation of CTA by both experienced and inexperienced readers. These findings show the added diagnostic value of including CTP in the acute stroke imaging protocol.

Introduction

Intravenous thrombolysis is the mainstay of treatment for arterial occlusions distal to the internal carotid artery, M1 segment of the middle cerebral artery (MCA) and the vertebral and basilar arteries. These occlusions are referred to as "distal vessel occlusions" (DVOs), to distinguish them from proximal large vessel occlusions. While demonstration of DVOs is not a requirement for thrombolysis, their detection is becoming increasingly relevant to clinical decision-making.

The main reason is that endovascular thrombectomy (EVT) can be used to treat occlusions involving large and medium-sized distal arteries in carefully selected patients. There is evidence of improved functional outcomes with EVT compared to standard medical management in patients with occlusion of the M2 segment of the MCA. M2 occlusions are therefore increasingly considered for EVT, which is also safe and technically feasible for occlusions involving the M3 segment of the MCA, the anterior cerebral artery (ACA) or the posterior cerebral artery (PCA). Advances in endovascular device technology have led to the development of smaller and more navigable stent retrievers and thromboaspiration devices that can reach smaller distal arteries, including the M4-segment of the MCA and the A4-segment of the ACA. Since these DVOs can cause severe neurological deficits when eloquent brain regions are supplied, EVT may be justified in order to achieve rapid reperfusion. It is also the only option for reperfusion in patients who are ineligible for thrombolysis. As such, distal vessel EVT is considered a "promising next potential frontier" for stroke therapy and the subject of current research. Since demonstration of a target arterial occlusion is required for triage to EVT, fast and accurate detection of DVOs is important to ensure timely treatment.

Detecting DVOs also allows the correct diagnosis to be made. This, in turn, is important for prognostication and ongoing management such as workup for an embolic source and secondary prevention. It is also possible that detection of a target DVO may become a requirement for thrombolysis if the treatment window is extended beyond 4.5 hours, to avoid futile treatment and justify the increased risk of thrombolysis.

CTA has become a routine part of the acute stroke imaging protocol. Its main purpose is to identify patients with proximal large vessel occlusions for triage to EVT. DVOs are more difficult to detect on CTA than these proximal occlusions, due to the smaller caliber, larger number, and poorer opacification of distal arteries. Reported sensitivity is as low as 33%, with 35% of M2 segment MCA occlusions missed at the time of initial CTA evaluation in one recent study.

CTP is now widely included in acute stroke CT protocols. The time to maximum of the tissue residue function ($T_{max}$) is a parameter that is routinely obtained from CTP when deconvolution-based post-processing is used. Tmax is well established for identifying salvageable ischemic penumbra in patients with proximal vessel occlusions. We have observed in our clinical practice that Tmax delay within a vascular territory indicates severe stenosis or occlusion of the supplying artery. This information can, in turn, be used to detect and localize distal arterial occlusions on CTA. These occlusions may otherwise be missed or difficult to find. Despite its real-world value in routine clinical practice, no previous studies have assessed and quantified the diagnostic utility of Tmax for detecting intracranial arterial occlusions.

The purpose of this study was to assess the added value of Tmax maps and verify our clinical impression that they facilitate detection of distal occlusions on CTA. We hypothesized that diagnostic accuracy, speed and confidence for detecting DVOs on CTA would increase with the use of Tmax for readers with different levels of experience.

Methods

Figure 12:
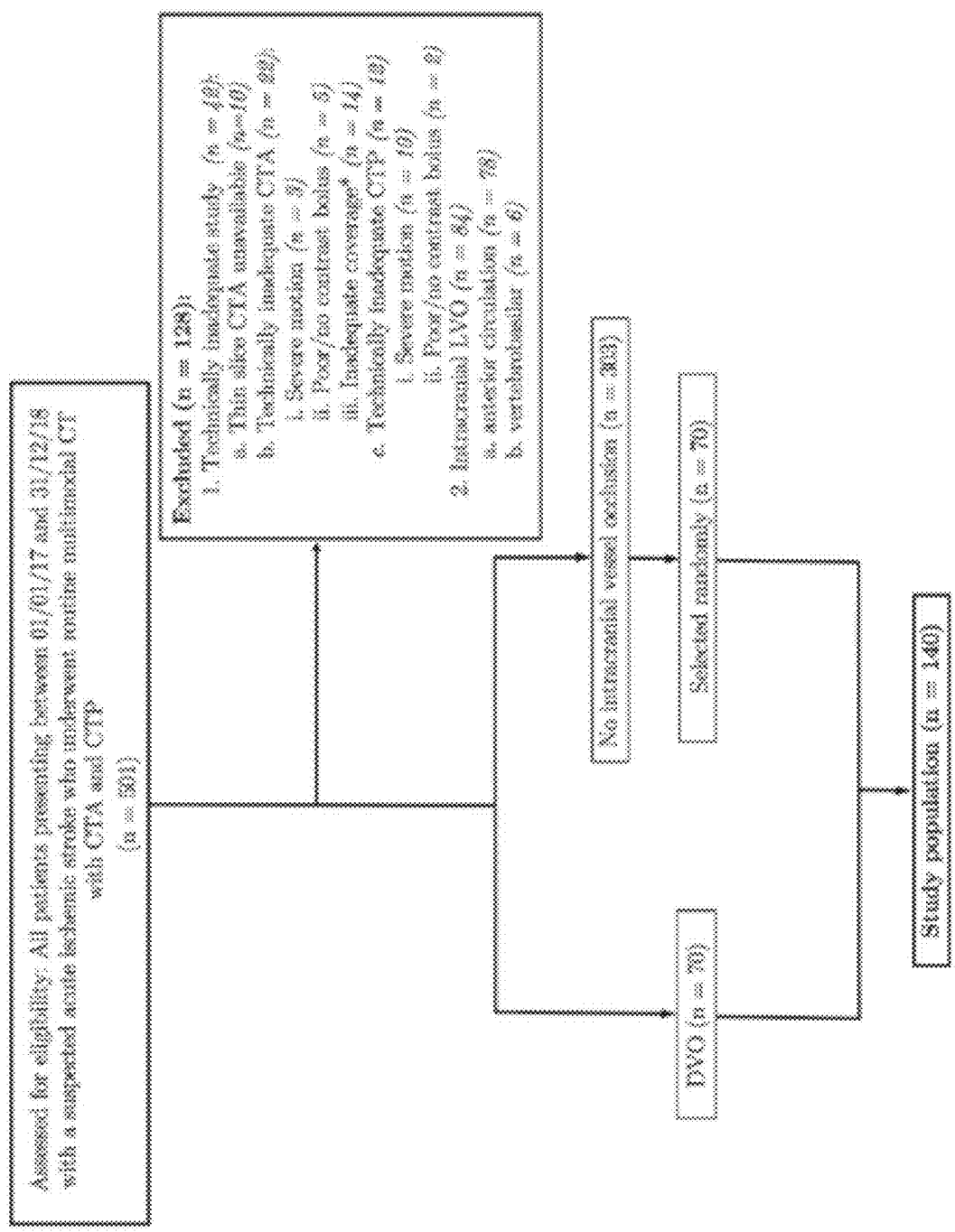
FIG. 12 shows a patient selection flow chart. All patients who had presented to our institution with a suspected acute ischemic stroke and who had been within the ECR window (and otherwise had met clinical eligibility criteria) underwent emergent multimodal CT with non-enhanced CT, CTA, and CTP as standard-of-care. *CTA did not extend to vertex, therefore anterior cerebral artery A4 and A5 segments not covered.

Patient Selection 501 consecutive patients who presented to our institution, a primary stroke center, between 1 Jan. 2017 and 31 Dec. 2018 and underwent multimodal CT for a suspected stroke were screened using our Picture Archiving and Communication System and Electronic Medical Records. Raw and post-processed images were assessed for technical adequacy by a neuroradiologist with 9 years' post-fellowship experience. Patients who met the following inclusion criteria were retrospectively identified: a. age≥18 years; b. multimodal CT with CTA and CTP; and c. within 24 hours of symptom onset or last known well. Exclusion criteria were: a. technically inadequate CTP or CTA (poor contrast bolus or substantial motion); b. thin-slice CTA images unavailable; and c. occlusion of the internal carotid artery. M1-segment of the MCA, vertebral artery or basilar artery (excluded to allow specific assessment of diagnostic performance for detection of more distal occlusions). 128 patients were excluded: 84 with a large vessel occlusion and 42 with a technically inadequate CTA or CTP (patient selection flowchart shown in the Supplemental material, FIG. 12).

The multimodal stroke CTs of all consecutive patients who met the inclusion criteria were reviewed by the neuroradiologist, who had access to all clinical records and imaging. All consecutive patients with a DVO were identified and included in the study. The same number of patients without any vessel occlusion were randomly selected from the remaining patients and included in the study. Data processing, scan anonymization and randomization were performed by this neuroradiologist.

A DVO was defined as an arterial occlusion involving the: A2 to A5 segments of the ACA; M2- to M4 segments of the MCA; P2 to P4 segments of the PCA; or the PICA, AICA or SCA. Proximal M2-occlusions are challenging to classify due to large inter-patient anatomical variability in size and dominance. While some may be considered proximal or large vessel occlusions, they are not recognized as such by AHA guidelines, are more difficult to detect than M1-occlusions on CTA and have therefore been included as "DVOs" in the study.

The study was approved by the local institutional review board which granted a waiver of written consent based on the retrospective study design and anonymization of all data. This investigator-initiated study received no financial support.

CT Image Acquisition, Reconstruction and Post-Processing

All patients were scanned on a 256-slice multi-detector CT (iCT 256, Philips Healthcare, Cleveland, Ohio, USA). Our routine multimodal "stroke CT" protocol consisted of non-enhanced CT (NECT) followed by CTP and then CTA. Scan techniques and parameters are detailed in the Supplemental material.

For CTP, images were acquired axially, reconstructed at 10 mm slice thickness, and processed using a commercially available software platform (RAPID 4.9, iSchemaView, Menlo Park, Calif.) that uses a delay-insensitive deconvolution algorithm with automated Arterial Input Function selection. The software calculates $T_{max}$ values for each image voxel, ranging from 0 to 12 seconds in 2 second increments, and displays them on a color-scale map.

Helically acquired CTA images were reconstructed axially at 0.8 mm sections. 3-plane (axial, coronal and sagittal) 4 mm thick multiplanar reformats (MPRs) and 10 mm-thick maximum intensity projections (MIPs) were also reconstructed.

Reference Standard

Two neuroradiologists (with 9 and 20 years post-fellowship experience, respectively) interpreted the CTAs in consensus using a systematic approach in conjunction with NECT and all available clinical and imaging data, including all CTP parametric maps (CBF, CBV, MTT and Tmax) as well any available follow-up scans. These "expert reads" served as the reference standard.

Image Review

The CTAs were interpreted independently by four readers with different levels of experience: a 2nd year radiology resident, a neuroradiology fellow, an attending radiologist (2 years post cardiovascular fellowship), and an imaging scientist. These readers had 18 months, 6 years, 8 years and 20 years of experience, respectively, in interpreting acute stroke imaging. All had preexisting knowledge of the major cerebral arteries, their segments and their supply territories, acquired through routine radiology training and clinical work. No additional training was provided for this study. Details of the patient's presenting neurological deficits were provided (to reflect clinical practice), however the readers were blinded to all other clinical and follow-up imaging data. There were no cases where the CTP acquisition did not cover the territory supplied by an occlusion detected by the neuroradiologists Reads were performed in two separate sittings, 2 months apart, to negate the effects of memory and learning. CTA and NECT raw data and reconstructions were made available at each sitting and viewed using a public-domain DICOM viewer (Horos, v3.3.5, www.horosproject.org). Scans were anonymized and presented in random order. Readers were permitted to manipulate the provided NECT and CTA data (e.g., windowing and performing MIPS) as they would in routine clinical practice. In the first sitting, $T_{max}$ maps were provided for the first half of the patient cohort but not the second. This was reversed in the second sitting.

Figure 9:
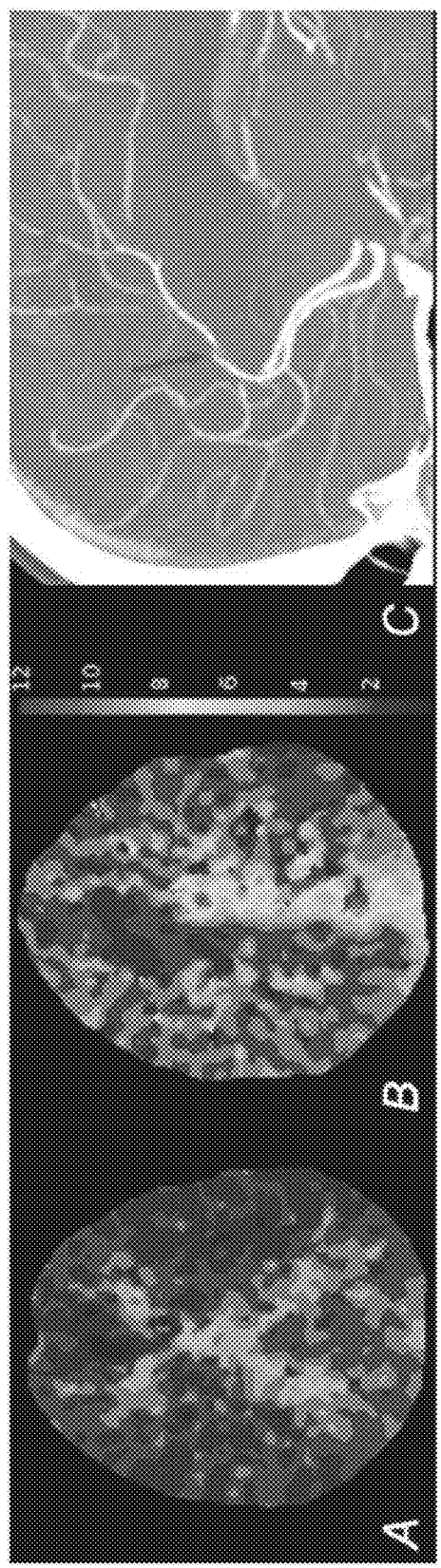
FIG. 9 includes a first image A showing a selected slice of a normal $T_{max}$ map, with no areas of delay, in a patient without a DVO; a second image B showing $T_{max}$ map (selected slice) showing marked delay in the left distal ACA territory; and a third image C showing Axial CTA MIP showing the culprit A4 segment ACA occlusion (red arrow) in this 72 year-old woman who presented with right leg weakness.

The readers were asked to:

1. Review $T_{max}$ maps, when available, prior to interpreting the CTA, to determine whether there is any territorial $T_{max}$ delay (FIG. 9).

2. Assess the CTA, recording the presence and location of a DVO/DVOs, and marking the location on thin-slice CTA images. When $T_{max}$ maps were available, the following approach was suggested to localize an occlusion on CTA:

a. If present, use the distribution $T_{max}$ delay conforming to an arterial territory to narrow down the side, major vascular territory and likely occluded segment. Perform a focused search.

b. If this fails, progressively broaden the search because there is considerable anatomical variability in the areas supplied by the major intracranial arteries and their segments.

Rate diagnostic confidence using a 5-point Likert scale: 1 (occlusion very unlikely).

2 (occlusion unlikely), 3 (uncertain), 4 (occlusion likely), and 5 (occlusion very likely).

Statistical Analysis

All statistical analyses were performed using MedCalc (MedCalc Statistical Software Version 17.2, 64 bit, Ostend, Belgium).

Each reader's diagnostic performance for detecting a DVO on CTA was assessed against the reference standard (expert reads) using receiver-operating characteristic (ROC) analysis. A true positive required both the presence and site of a DVO to be correctly identified. Change in accuracy with addition of Tmax was assessed by pair-wise comparison of the areas under the ROC curves (AUCs) using the De Long algorithm.

The added value of Tmax on diagnostic confidence was assessed with shift analysis, using the Wilcoxon signed-rank test to assess significance of any change. Inter-reader agreement was assessed using the Fleiss' kappa statistic (kF). Cohen's kappa statistics (k) were used to determine agreement between each pair of readers.

The Wilcoxon signed-rank test was used to determine whether there was a significant difference in time taken to interpret CTA when $T_{max}$ was added.

Confidence intervals were calculated using a bootstrap procedure with 10.000 samples with replacement. A level of 0.001 was taken to indicate significance for all tests except shift analysis of confidence where a level of 0.05 was applied.

Results

CTAs were analyzed from 140 patients (median age 73, IQR 64-83), of which 77 were male and 70 had a DVO (including 22 with proximal M2 occlusions). Patients' baseline characteristics and the details of vessel occlusion are provided in FIG. 6.

Diagnostic Accuracy

The results of ROC analyses for detecting a DVO on CTA are given in FIG. 7. For all readers, sensitivity and specificity increased with addition of Tmax, and accuracy (as measured by AUC) increased significantly (p<0.001). Mean sensitivity for detecting a DVO increased from 70.7% to 90.4% with addition of Tmax, while mean specificity increased from 87.5% to 95.7%.

Figure 19:
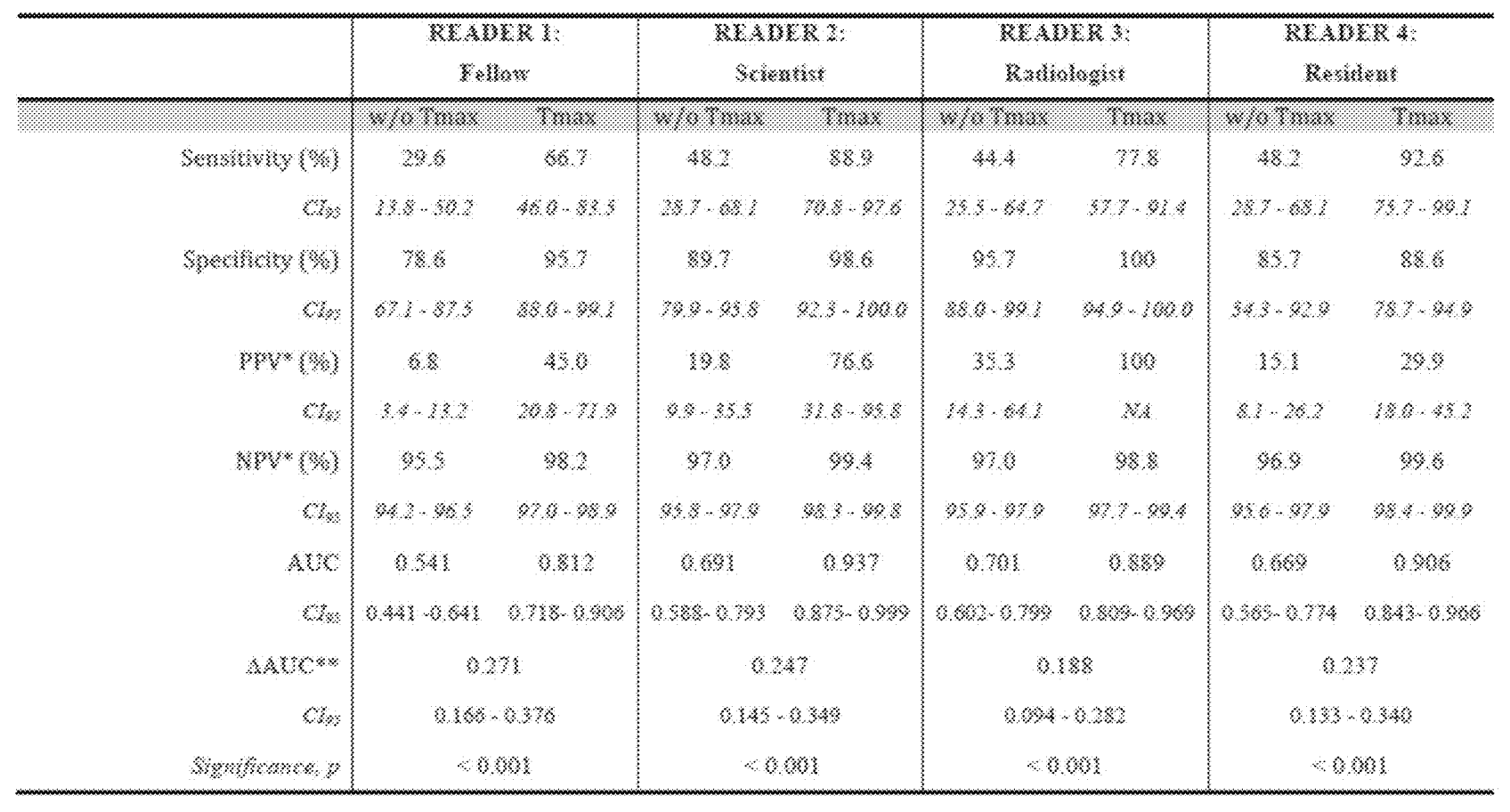

Analysis was repeated following exclusion of the 22 patients with proximal M2-MCA occlusions, including 10 with occlusion of the proximal trunk of a dominant or co-dominant M2-division which may be considered proximal vessels (FIG. 8 and FIG. 18). Mean sensitivity for detecting a DVO on CTA increased from 61.0% without $T_{max}$ to 86.5% when $T_{max}$ was used. The gain in sensitivity was therefore larger than when proximal M2 occlusions were included. Following exclusion of the 43 patients with either an M2-MCA or P2-PCA occlusion (FIG. 19), which allowed diagnostic sensitivity for detecting more distal occlusions to be isolated, mean sensitivity increased from 42.6% without $T_{max}$ to 81.5% with Tmax. The sensitivity for detecting DVOs on CTA alone was therefore much lower than when M2 and P2 occlusions were included. However, the gain in sensitivity with addition of $T_{max}$, and therefore increase in AUC, was larger. On all three analyses, AUC increased significantly (p<0.001) for all readers when $T_{max}$ was used, with the largest improvement occurring when only the most "distal" DVOs were considered (ie following exclusion of M2 or P2 occlusions).

Figure 13:
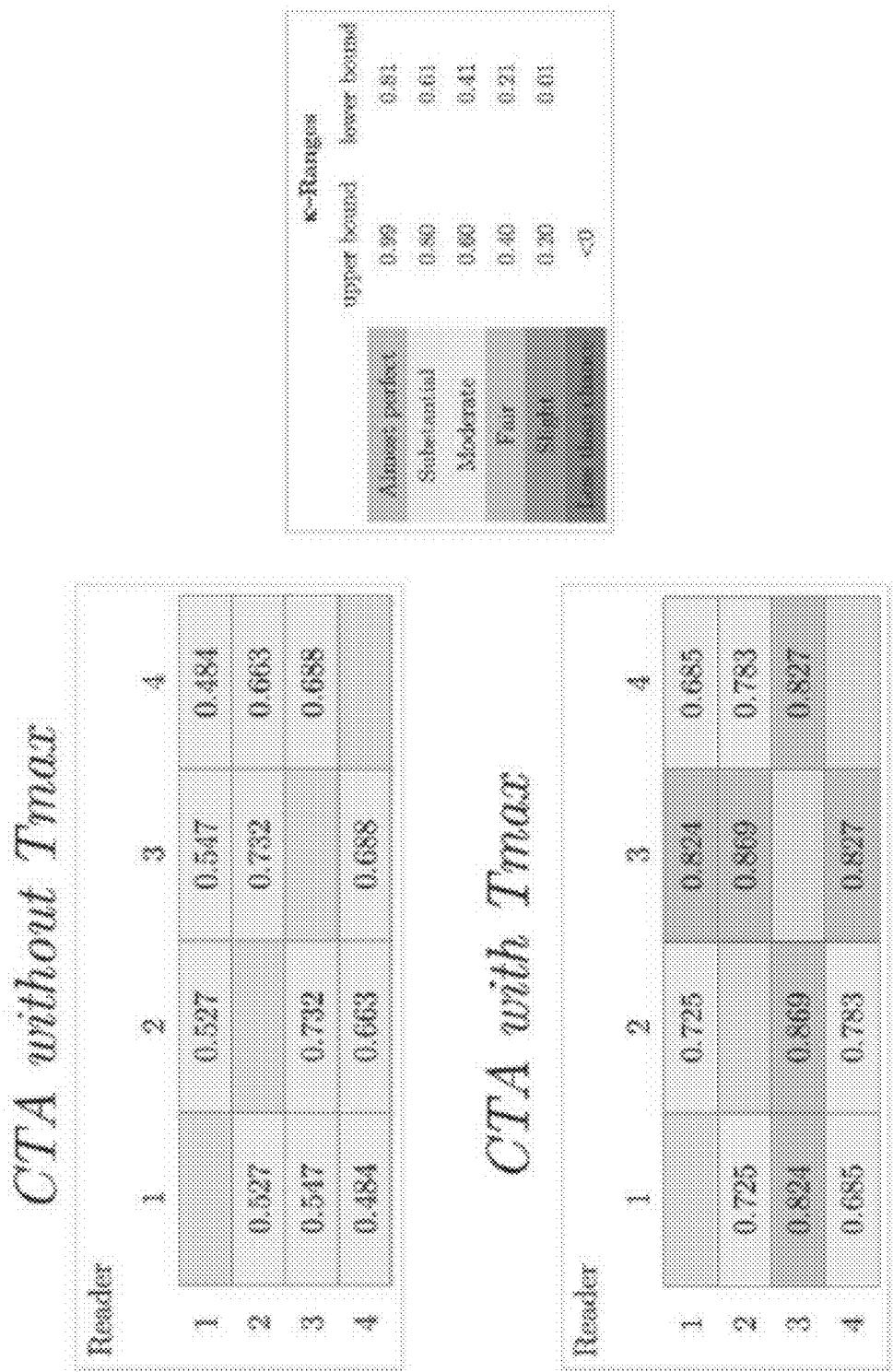
FIG. 13 shows inter-reader agreement between pairs of readers regarding the presence of a DVO on CTA, with and without Tmax, determined using Cohen's kappa statistics. Without Tmax, agreement between readers was either moderate or substantial. Agreement increased with use of Tmax, to either substantial or almost perfect for all pairs of readers.
Figure 14:
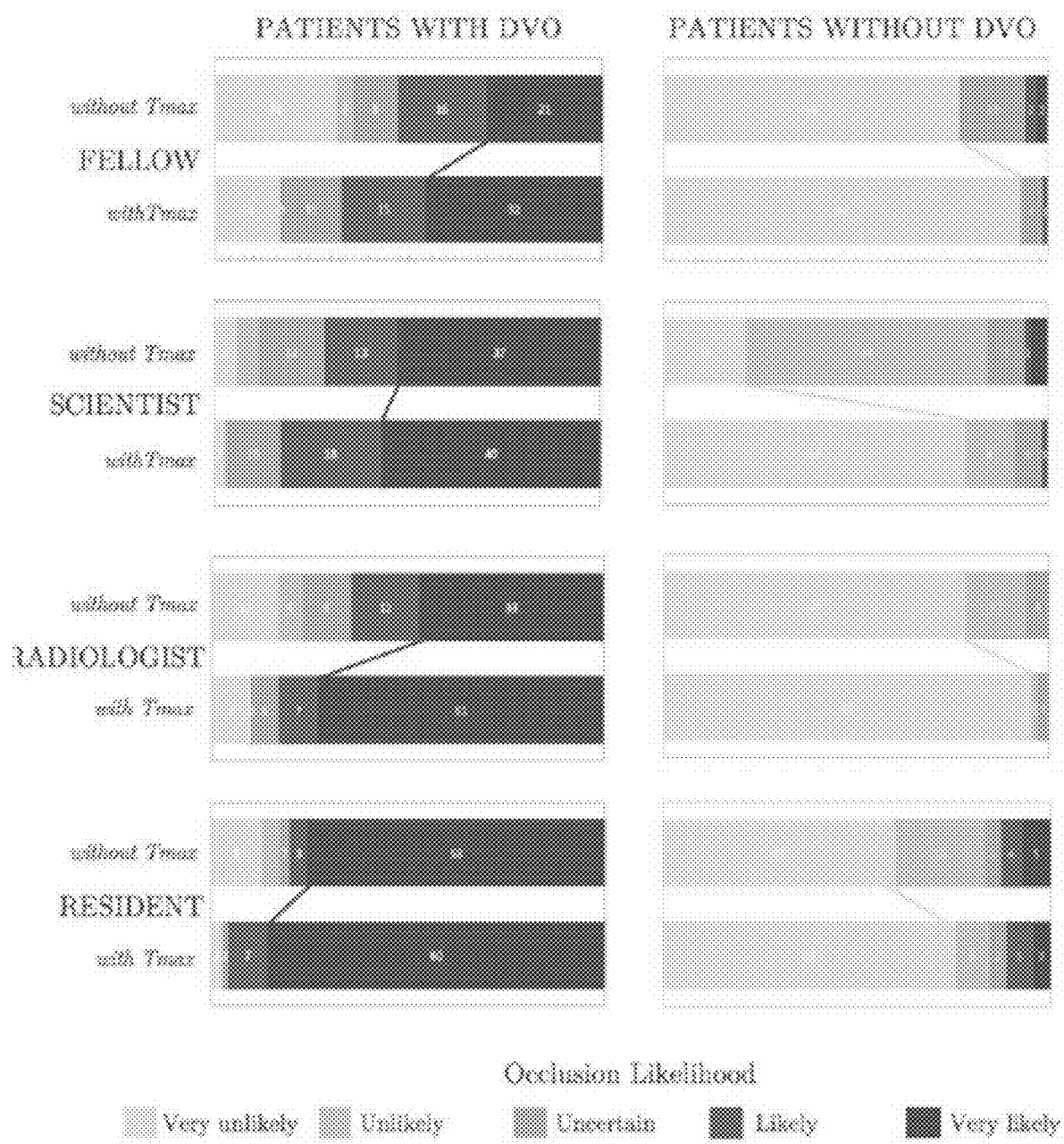
FIG. 14 shows shift analysis of diagnostic confidence include images A-D. When analysis was confined to patients with a DVO (on the reference standard), there was a positive shift in confidence for all readers. More patients were identified as "very likely" to have an occlusion. E-H. In patients without a DVO (on the reference standard), confidence in the absence of a DVO increased. More patients were considered "very unlikely" to have an occlusion.

Inter-reader agreement on CTA improved with addition of $T_{max}$, from kF=0.61 (CI95=0.54-0.68) to kF=0.79 (CI95=0.72-0.86). There was also greater agreement between pairs of readers (FIG. 13) when CTA was interpreted with $T_{max}$ than without it.

Diagnostic Confidence

Figure 11:
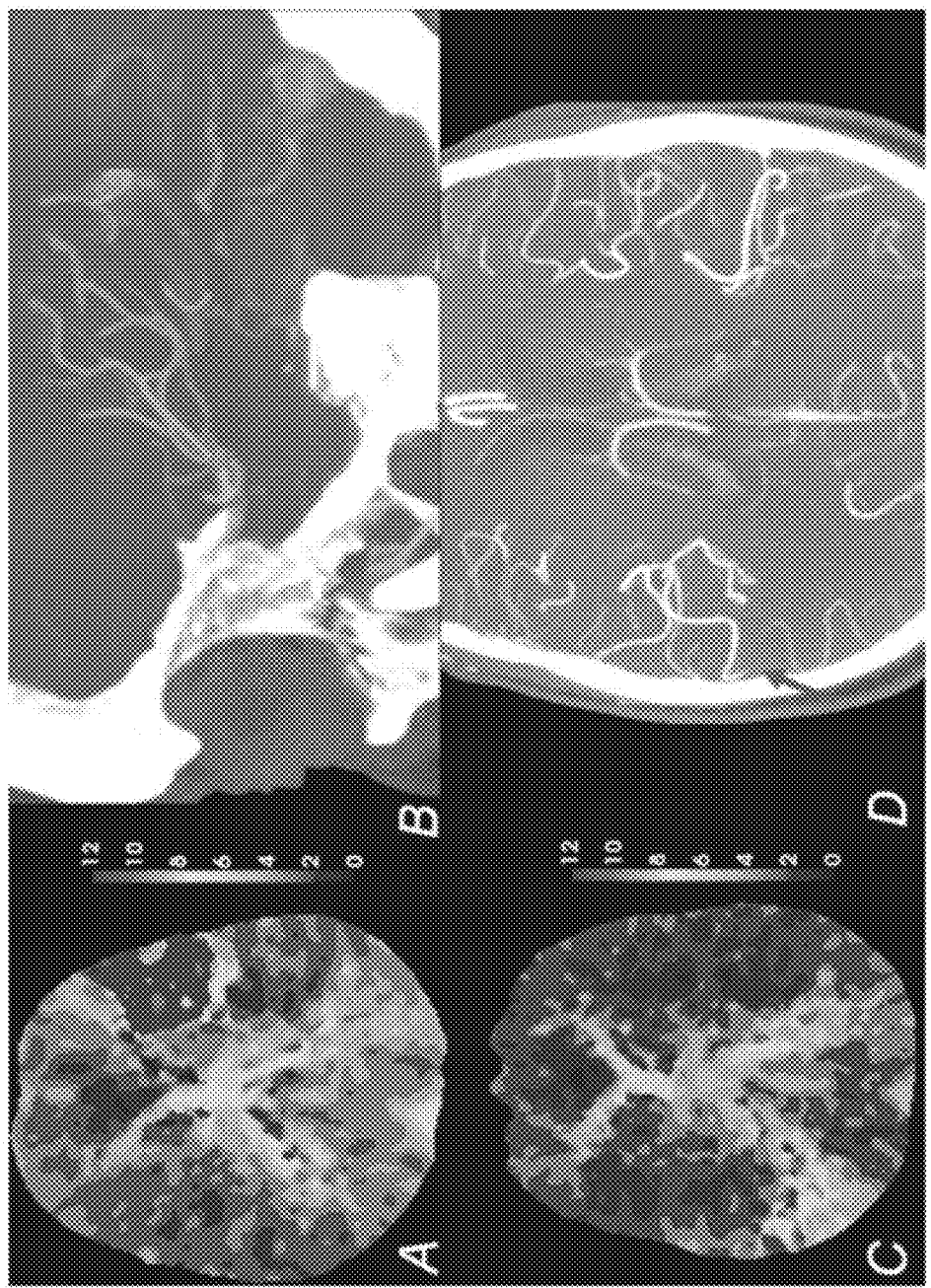

The gain in confidence with addition of Tmax is shown in the Supplemental material in FIG. 11 and FIG. 20. In patients deemed to have a DVO on the reference standard, diagnostic confidence that an occlusion was present increased significantly (p<0.05) for all four readers. Each reader had fewer false negatives and more patients in whom an occlusion was deemed very likely.

All readers were more confident in dismissing a DVO on CTA when Tmax was used. Increase in confidence reached significance (p<0.05) for all readers except the resident, who had a larger number of false positives (n=8). The number of patients in whom an occlusion was considered very unlikely increased for all readers.

Time to Interpret CTA

Figure 10:
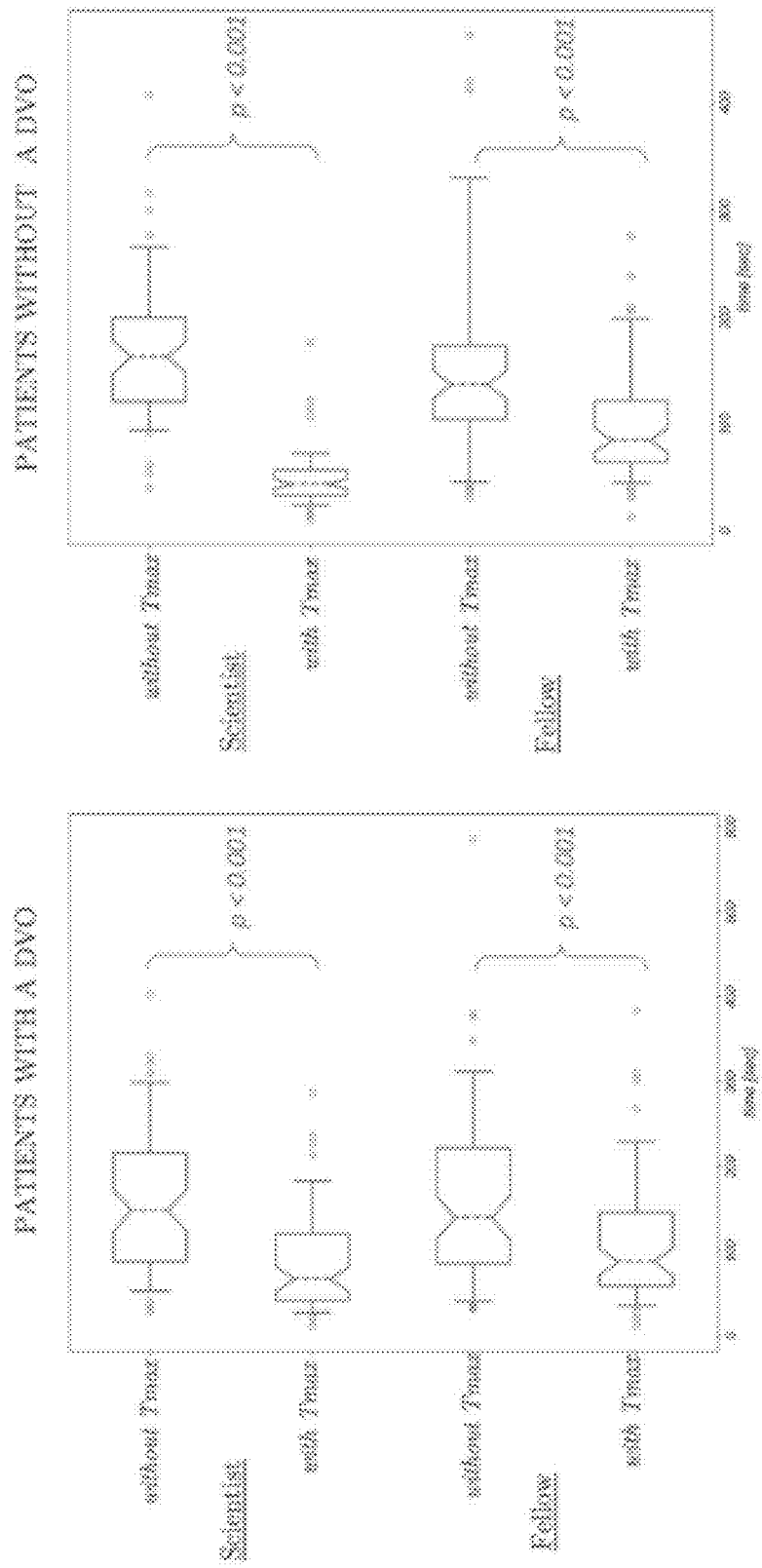
FIG. 10 shows box and whisker plots of time taken to interpret CTA in patients with and without a DVO on the reference standard. The dashed red line indicates median time, the upper and lower edges of the boxes indicate the first and third quartiles, respectively, the notches represent the 95% confidence intervals of the median and the whiskers extend to the 5th and 95th centiles. Outliers are shown in circles. For both readers, interpretation was significantly faster (p<0.001) with $T_{max}$ than without it. The spread of times also decreased with $T_{max}$.

CTA was interpreted significantly faster (p<0.001) with use of Tmax (FIG. 21): median interpretation time was 1.6 times faster for the fellow and 3.3 times faster for the scientist with Tmax. Box and whisker plots of CTA interpretation time are shown for the two readers who were timed (FIG. 10). Patients were dichotomized into those with a DVO and those without a DVO on the reference standard. Interpretation time was significantly (p<0.001) shorter with Tmax than without it for both groups. This indicates that DVOs were both detected and dismissed faster. Median time to detect M2-occlusions was less than for M3 and M4-occlusions, but this did not reach significance (FIG. 22).

Post Hoc Analysis

False negatives and false positives are detailed in FIGS. 23 and 24, respectively in the Supplement material.

The number of false negatives decreased for all readers with addition of $T_{max}$. Four proximal M2 occlusions were missed by one or more of the readers on CTA without $T_{max}$ (FIG. 11 images A and B). Only one was missed, by one reader, with Tmax. Fewer "distal" DVOs were missed on CTA when Tmax was used (FIG. 11 images C and D). M4 segment MCA occlusions remained a challenge, however, with the fellow and radiologist each missing 5 even with Tmax. There were too few distal ACA occlusions in the cohort for meaningful analysis. All 8 PCA occlusions distal to the P2-segment were detected on CTA with $T_{max}$.

Figure 15:
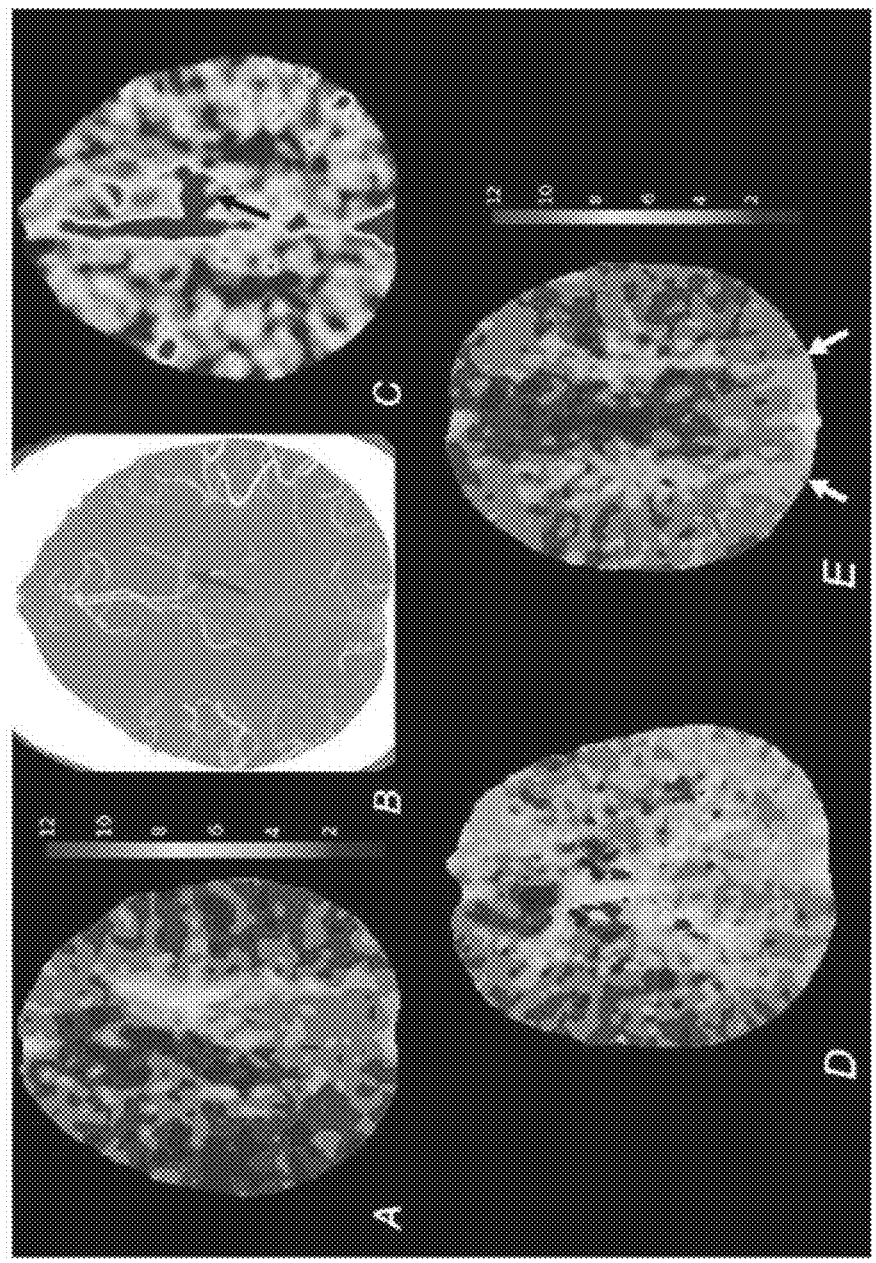
FIG. 15 shows $T_{max}$ delay not due to a DVO. These led to false positives for the trainees. In image A. $T_{max}$ delay>6 seconds is seen in the left distal ACA territory (arrow) on this selected slice from the $T_{max}$ maps of an 83-year-old woman who presented with sudden onset right-sided weakness. In image B. The CTA shows venous structures in keeping with a developmental venous anomaly (arrow) in the corresponding area. No distal ACA occlusion was evident. In image C. Relative cerebral blood volume map showing blood pool (arrow) within the venous anomaly. The experienced readers recognized the cause of $T_{max}$ delay and dismissed a DVO. In image D. Left hemispheric $T_{max}$ delay, more pronounced in the external watershed, in a 70-year-old man who presented with a transient right-sided weakness and speech disturbance. The patient developed a headache, but no infarct on follow-up imaging. The presentation was ascribed to a hemiplegic migraine. E. "Borderzone" $T_{max}$ delay is a pattern which involves the deep white matter watershed (red arrows) as well as the external watershed (the MCA-PCA watershed indicated by white arrows). It results from contrast bolus dispersion, which causes delayed arrival of contrast in the most distal arterial territories. Causes for bolus dispersion include a proximal (e.g., internal carotid artery) arterial stenosis or occlusion, poor cardiac output, and a poor contrast bolus injection.

There were a number of false positives for a DVO on CTA without $T_{max}$. All were related to small caliber distal vessels, especially branch and turning points. The few false positives on CTA with $T_{max}$ were also related to small caliber, poorly opacified distal vessels. $T_{max}$ delay was present in all except one of these cases but did not conform to the territory of an intracranial artery. A recurrent cause of false positives for the two less experienced readers was Tmax delay in the deep white matter and external watershed ("borderzone pattern") (Supplemental material, FIG. 15 image E).

14 patients had two DVOs (FIG. 16). The benefit of $T_{max}$ was greater for the two experienced readers; both occlusions were detected and correctly identified in 3 additional patients by the radiologist and 7 additional patients by the scientist.

Discussion

The added value of $T_{max}$ maps on diagnostic performance for detecting DVOs on CTA was assessed in this study. Diagnostic accuracy, confidence and speed were shown to improve significantly with addition of Tmax for readers with different levels of experience in interpreting stroke imaging. The beneficial effect of Tmax in aiding detection of DVOs on CTA was greater for more distal occlusions.

CTP is now widely included in the acute stroke CT protocol. Its primary purpose is to identify patients with proximal arterial occlusions with salvageable brain tissue who may therefore benefit from EVT. It also provides information about the macrovasculature that can be leveraged to improve detection of vessel occlusions. Perfusion maps were shown to improve detection of intracranial arterial occlusions in one previous study that was not specifically designed to evaluate DVOs and included only a small number of these distal occlusions. Another important point of distinction between this previous study and ours is that Tmax was not used.

Tmax was used in some EVT trials to identify salvageable ischemic penumbra and is now routinely available on most CTP post-processing software platforms. It can also be used to assess early reperfusion with treatment. Tmax reflects the delay in contrast arrival in tissue relative to a proximal arterial reference point. This arterial reference point is called the Arterial Input Function (AIF) and is an essential part of deconvolution-based perfusion analysis. An intracranial arterial occlusion prolongs arterial transit time, and therefore Tmax, within the territory that is supplied. Time-to-peak (TTP), another time-based parameter that has been used to assess penumbra, is also prolonged when there is delayed arterial transit. However, unlike $T_{max}$, it is not obtained through deconvolution and is therefore not corrected for the shape of the contrast bolus. As such, $T_{max}$ is less sensitive than TTP to bolus delay proximal to the AIF, and more specific for delays in arterial transit between the AIF and tissue caused by an occlusion. The distribution of $T_{max}$ delay can be used to narrow down the laterality, major territory, probable segment (e.g., M2 versus M3) and likely location of an arterial occlusion. A more focused search can then be performed. The alternative of systematically interrogating all cerebral arteries to the most distal discernible level is very time-consuming and therefore not feasible under clinical time pressures. Clinical information regarding neurological deficit narrows the "search field", but is not always available or reliable. $T_{max}$ maps are objective and consistently available when CTP is performed. To our knowledge, this is the first study evaluating the utility of $T_{max}$ for detecting intracranial arterial occlusions.

As hypothesized, diagnostic performance for detecting DVOs on CTA improved significantly with the use of $T_{max}$. The effect size was sufficiently large to show significant improvement, using a p value cutoff of 0.001, even with a sample size of 140, including 70 patients with a DVO. Since information on neurological deficit was provided, the beneficial effect of Tmax was additive to any gain provided by clinical notes. Sensitivity for detection of DVOs on CTA alone is likely lower, and improvement in performance with Tmax may therefore be even greater, when reliable clinical information is unavailable.

Importantly, fewer proximal M2 occlusions were missed. Patients with M2 occlusions are increasingly considered for EVT since it may improve their functional outcomes. M2 occlusions are easily detected by experienced neuroradiologists but can be missed by trainees and general radiologists as shown in this study, 35% of M2 occlusions were missed on CTA evaluation in a previous study performed at a primary stroke center. Trainees interpret the bulk of CTAs performed at stroke referral centers, while these scans are typically interpreted by general radiologists at primary stroke centers. Improving detection of M2 occlusions by these less experienced readers is therefore of high clinical relevance, to ensure that patients do not miss out on potentially beneficial treatment.

The gain in sensitivity with addition of $T_{max}$, and therefore benefit, were greater for more distal occlusions. Poor sensitivity for detecting M4 and distal ACA occlusions on CTA alone can be explained by the small caliber and large number of these vessels, making detection akin to "finding a needle in a haystack" even with accurate clinical notes. $T_{max}$ maps narrowed the search field, increasing the chances of finding the culprit occlusion on CTA. Despite improvement in sensitivity, some distal anterior circulation occlusions were still missed by the readers. It is important to note here that an occlusion is sometimes not clearly visible on CTA (due to the small caliber and poor opacification of the occluded artery), despite unequivocal territorial $T_{max}$ delay suggestive of a DVO. If an alternative cause cannot be found, it may be reasonable to diagnose a likely distal occlusion in these cases. The readers fared better for detecting distal PCA than MCA occlusions. This may be due to the smaller spatial extent and less arborization of the PCA, compared to the MCA. Since sensitivity on CTA with $T_{max}$ was imperfect, it cannot be used to definitively exclude a DVO. Of note, sensitivity was not related to reader experience level. The scientist and the resident had the highest sensitivity, both with and without Tmax. A possible explanation is that these readers had a more methodical approach to reading the CTAs.

Specificity for detecting a DVO on CTA exceeded 95% with addition of $T_{max}$, for all readers except the resident, which is important if the findings are used to guide treatment, to ensure that futile and potentially harmful reperfusion is avoided in patients without a DVO. Specificity was related to level of experience in interpreting CTA and CTP; greater experience enabled the senior readers to differentiate between occlusions and poorly opacified distal vessels, and recognize and dismiss Tmax delay that did not conform to a vascular territory.

Interpretation of CTA was significantly faster with addition of Tmax. As expected, DVOs were detected faster due to the search field being narrowed, but occlusions were also dismissed more quickly. Faster diagnosis not only expedites treatment, it also improves workflow efficiency. The latter is important in clinical practice, particularly in the setting of busy comprehensive stroke centers. An important caveat in using $T_{max}$ to expedite interpretation is that readers must continue to methodically scrutinize CTAs for other, incidental findings and avoid succumbing to "streetlight effect".

Diagnostic confidence in the presence or absence of a DVO on CTA increased for all readers with $T_{max}$. One likely reason is that the Tmax maps provide additional evidence to corroborate or reject the findings on CTA alone; diagnostic confidence is greater when two separate tests indicate that an occlusion is either present or absent. Another factor that likely contributed to improvement in all metrics of diagnostic performance is that $T_{max}$ maps are easy to interpret. They have high contrast-to-noise ratio (CNR). While CBF and CBV have substantial grey-white matter contrast, $T_{max}$ values do not vary with tissue type and have rather flat contrast in normal brain. Even small or subtle areas of $T_{max}$ delay therefore appear conspicuous, and can be detected and characterized reliably and confidently. This, in turn, contributes to increased sensitivity when the findings on $T_{max}$ were used to guide the search for a DVO on CTA. Conversely, maps with no $T_{max}$ delay appear monochromatic, making it easy to interpret the absence of abnormality and dismiss an occlusion with high certainty. While the findings of a DVO on CTA can be subtle due to the small caliber and poor opacification of distal vessels, the findings on Tmax are more apparent and therefore less prone to variable interpretation. Accordingly, the use of $T_{max}$ led to greater consistency of CTA interpretation, with higher inter-reader agreement.

An alternative method that has been reported to improve detection of DVOs is wavelet-transformed angiography (waveletCTA), which is also obtained by post-processing of CTP data. Its clinical uptake has been limited by the requirement for thin-slice CTP and specialist post-processing software that is not widely available. In contrast, most CTP post-processing software packages produce $T_{max}$ maps, and can so from thick-slice CTP, making the use of Tmax feasible in routine clinical practice at even small peripheral centers.

An important limitation to note here is that CTP is only recommended by guidelines in the late (6-24 hour) timewindow. Not all stroke centers routinely perform CTP in the early window, since it incurs an additional radiation dose and its role in patients within 6 hours of stroke onset has not been established. CTP also has diagnostic utility beyond tissue classification, aiding the diagnosis of stroke and some stroke mimics such as migraine, therefore some centers.

A limitation of using Tmax maps to aid detection of DVOs on CTA is that non-territorial Tmax delay can lead to false positives and lower specificity. The experienced readers dismissed DVOs in these cases, suggesting that such errors can be avoided with training in the interpretation of Tmax maps, specifically to differentiate Tmax delay in a vascular territory from delays that either cross territories (e.g., due to migraine), are artefactual or "borderzone" in distribution. "Borderzone" Tmax delay occurs with contrast bolus dispersion, for example due to a poor injection, proximal arterial steno-occlusive disease, and impaired cardiac output. It is manifested as Tmax delay in arterial watershed areas. CTP acquisition with limited brain coverage is a potential cause of false negatives, if the territory supplied by the occluded vessel is not included. This is avoided with whole brain CTP acquisition on modern multi-detector array CT scanners. When only limited coverage is feasible, targeting the CTP acquisition to the clinical presentation (e.g., posterior circulation) can avoid false negatives.

A limitation of the study is that only one CT scanner and CTP post-processing software package were used. This may limit the generalizability of the findings. The algorithms used by different post-processing software packages are variable and most, but not all, use deconvolution-based post-processing—a requirement for obtaining Tmax. There are also substantial differences in the derived perfusion parameters, even between packages that use deconvolution-based post-processing, resulting in variability in quantification of the infarct core and penumbra. The variability is less likely to affect qualitative assessment, however differences in display of parametric maps (e.g., color scale) may impact on visual assessment. In turn, this may affect diagnostic performance for detection of territorial Tmax delay which warrants further evaluation in a future study.

A potential limitation of the study is that the prevalence of DVOs in the study cohort (50%) was higher than in the population of stroke patients who undergo multimodal CT. The true prevalence of DVOs is much lower, and likely closer to the 14% observed in the cohort screened for the study. Use of a "balanced" sample may bias the absolute sensitivity and specificity for detecting a DVO on CTA, both with and without $T_{max}$. These values should, therefore, be interpreted with caution. However, the primary purpose of this study was to assess the relative change in diagnostic performance for detecting DVOs on CTA when Tmax was added, rather than absolute diagnostic performance.

Another potential limitation of the study is the choice of reference standard: an expert read of the CTAs instead of digital subtraction angiography (DSA), which is the reference standard for detecting intracranial vascular pathology. Using the CTA was justified because DVOs can recanalize or migrate between angiographic modalities, especially when thrombolysis is administered, which would render DSA inaccurate as a reference standard. The authors recognize that some very distal DVOs may have been missed by all readers, including the expert reader. This would affect the determination of absolute accuracy. It is, however, less relevant for comparative assessment of the diagnostic performance on CTA with and without Tmax, which was the purpose of this study

CONCLUSIONS

DVOs were detected with greater accuracy, confidence and speed on CTA when Tmax maps were used to focus the search for a vessel occlusion. While the beneficial effect was greater for more distal occlusions. Tmax also helped detect M2 occlusions, which is important clinically since they are considered a target for EVT. Our findings demonstrate significant added value of CTP beyond tissue classification, with the potential to benefit management of more patients than simply those with proximal arterial occlusions. By showing that Tmax can be leveraged to improve detection of vessel occlusions by trainees and a generalist, our findings encourage the inclusion of CTP in the acute stoke imaging protocol at both comprehensive and primary stroke centers.

Supplemental Material

Part S1: Randomization Procedure for Selecting 70 "Control" Patients with No Vessel Occlusion The 303 patients with no vessel occlusion were entered into an Excel spreadsheet. The "randomization" function in Excel was used to generate a random number for each patient. The "Data sort" function was then used to order the patients according to the randomly assigned numbers, from lowest to highest. The first 70 patients were selected.

The same randomization procedure in Excel was used to determine the order in which the 140 patients included in the study were presented to the readers. The same order was kept for the first and second reads.

Part S2: NECT, CTP, and CTA Technique and Scan Parameters

Non-enhanced CT was acquired in helical mode with the following parameters: 0.625 mm slice collimation, spiral pitch factor of 0.283, tube voltage of 120 kVp, and image matrix 512×512. Images were reconstructed using a UB kernel at 1 mm overlapping sections, with axial, coronal, and sagittal multiplanar reconstructions performed at 4 mm slice thickness.

For the CTP, 50 mL of non-ionic contrast agent (350 mg iodine/mL, iohexol Omnipaque 350. GE Healthcare. Wis. USA) was injected intravenously, followed by a 50 mL saline flush. A flow rate of 5 mUs was used for both injections. The CTP acquisition parameters were as follows: 35 consecutive scans, 2.05 s mean temporal resolution, 80 kVp tube voltage, 160 mA tube current, 500 ms gantry rotation time, 80 mm z-axis coverage, 1.5 mm slice collimation and 512×512 acquisition matrix. Images were reconstructed using an iterative reconstruction (iDose) factor of 4 at 10 mm slice thickness.

CTA was performed using 80 mL of the same non-ionic contrast agent injected intravenously at a rate of 5 mUs, followed by a 40 mL saline flush at 6 mUs. Acquisition parameters were as follows: craniocaudal coverage from the aortic arch to vertex, 100 kVp tube voltage with tube current modulation, slice collimation width 0.625 mm, image matrix 512×512, and spiral pitch factor 0.618. The following reconstruction parameters were used: iterative reconstruction (iDose) factor of 5 and convolution kernel B. Contrast bolus triggering was performed in the aortic arch.

What is claimed is:

1. A method comprising:
    accessing, by a computing system including one or more processing devices and one or more memory devices, first training data that includes a first plurality of images of brains of individuals, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present;
    accessing, by the computing system, second training data that includes a second plurality of images of brains of individuals, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present;

generating, by the computing system, one or more computational models based on the first training data and the second training data, the one or more computational models to identify abnormalities present in vessels of brains of individuals;

accessing, by the computing system, one or more additional images of a brain of an individual, the one or more additional images being captured using a perfusion-based imaging technique or a diffusion-based imaging technique;

determining, by the computing system, one or more patterns of the one or more perfusion parameters or the one or more diffusion parameters included in the one or more additional images;

analyzing, by the computing system and using the one or more computational models, the one or more patterns in relation to the first plurality of patterns and the second plurality of patterns to determine a measure of likelihood that an abnormality is present in the brain of the individual; and generating, by the computing system and based on the measure of likelihood, a user interface that includes an indication that an abnormality is present in the brain of the individual.

2. The method of claim 1, comprising:
determining values of a perfusion parameter that indicate a time to maximum of a tissue residue function for a voxel of the one or more images.

3. The method of claim 2, comprising:
performing, by the computing system, one or more deconvolution operations with respect to contrast agent concentration curves of voxels included in the one or more images with respect to an arterial input function to generate the tissue residue function.

4. The method of claim 1, comprising:
determining values of a perfusion parameter that indicate an average transit time of contrast agent through a region of the brain.

5. The method of claim 1, wherein the one or more additional images indicate the values of the one or more perfusion parameters or the values of the one or more diffusion parameters in a plurality of regions of the brain of the individual.

6. The method of claim 1, wherein the first training data includes classification data that labels the first plurality of images as being obtained from the first individuals in which an abnormality is not present and that labels the second plurality of images as being obtained from the second individuals in which an abnormality is present in vessels of the brains of the second individuals.

7. The method of claim 1, wherein the second training data includes one or more first additional images that correspond to an abnormality of a first vessel that disrupts blood flow to a first region of the human brain and one or more second additional images that correspond to an abnormality of a second vessel that disrupts blood flow to a second region of the human brain, the first vessel having a different location from the second vessel in the human brain.

8. The method of claim 7, wherein the second training data includes first additional classification data that labels the one or more first additional images as being associated with an abnormality of the first vessel and second additional classification data that labels the one or more second additional images as being associated with an abnormality of the second vessel.

9. The method of claim 1, comprising:
training, by the computing system and using the first training data and the second training data, one or more convolutional neural networks to identify when an abnormality is present in brains of individuals based on patterns included in images derived from one or more perfusion-based imaging techniques or one or more diffusion-based imaging techniques.

10. The method of claim 1, wherein the one or more perfusion-based imaging techniques include a computed tomography perfusion-based imaging technique or a magnetic resonance perfusion-based imaging technique.

11. The method of claim 1, comprising:
generating, by the computing system and based on the likelihood of the abnormality being present in the brain of the individual, a text-based identifier of a vessel in which the abnormality is present.

12. The method of claim 1, wherein the abnormality is present in a vessel in the brain of the individual in which the abnormality is present is a distal vessel of the human brain, the distal vessel comprising at least one of A2 to A5 segments of the anterior cerebral artery, M2-M4 segments of the middle cerebral artery, P2 to P4 segments of the posterior cerebral artery, posterior inferior cerebellar artery, anterior inferior cerebellar artery, or superior cerebellar artery.

13. A system comprising:
one or more hardware processors; and
one or more non-transitory computer-readable storage media including computer-readable instructions that, when executed by the one or more hardware processors, cause the one or more hardware processors to perform operations comprising:

accessing first training data that includes a first plurality of images of brains of individuals, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present;

accessing second training data that includes a second plurality of images of brains of individuals, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present;

generating one or more computational models based on the first training data and the second training data, the one or more computational models to identify abnormalities present in vessels of brains of individuals;

accessing one or more additional images of a brain of an individual, the one or more additional images being captured using a perfusion-based imaging technique or a diffusion-based imaging technique;

determining one or more patterns of the one or more perfusion parameters or the one or more diffusion parameters included in the one or more additional images;

analyzing, using the one or more computational models, the one or more patterns in relation to the first plurality of patterns and the second plurality of patterns to determine a measure of likelihood that an abnormality is present in the brain of the individual; and generating, based on the measure of likelihood, a user interface that includes an indication that an abnormality is present in the brain of the individual.

14. The system of claim 13, wherein the one or more non-transitory computer-readable storage media include additional computer-readable instructions that, when executed by the one or more hardware processors, cause the one or more hardware processors to perform additional operations comprising:
obtaining additional imaging data that corresponds to one or more additional images captured using a computed tomography angiography imaging technique;
determining a portion of the additional imaging data that corresponds to the region of the brain of the individual in which the abnormality is present;
analyzing the portion of the additional imaging data to determine a vessel that supplies blood to the region; and
determining that the abnormality is present in the vessel.

15. The system of claim 14, wherein the one or more non-transitory computer-readable storage media include additional computer-readable instructions that, when executed by the one or more hardware processors, cause the one or more hardware processors to perform additional operations comprising:
determining, based on the additional imaging data, intensity values of voxels that correspond to a plurality of candidate vessels that supply blood to the region of the brain of the individual, wherein the vessel is included in the plurality of candidate vessels; and
determining, based on the intensity values, that the abnormality is present in the vessel.

16. The system of claim 13, wherein the one or more non-transitory computer-readable storage media include additional computer-readable instructions that, when executed by the one or more hardware processors, cause the one or more hardware processors to perform additional operations comprising:
determining a region of the brain of the individual that corresponds to voxels having values of the one or more perfusion parameters or values of the one or more diffusion parameters that have at least the threshold value.

17. One or more non-transitory computer-readable media storing computer readable instructions that, when executed by one or more processing devices, cause the one or more processing devices to perform operations comprising:
accessing first training data that includes a first plurality of images of brains of individuals, the first plurality of images being captured using a perfusion-based imaging technique or a diffusion-based imaging technique and indicating a first plurality of patterns of values of one or more perfusion parameters or one or more diffusion parameters in individuals in which a brain abnormality is not present;
accessing second training data that includes a second plurality of images of brains of individuals, the second plurality of images being captured using the perfusion-based imaging technique or the diffusion-based imaging technique and indicating a second plurality of patterns of values of the one or more perfusion parameters or the one or more diffusion parameters in individuals in which a brain abnormality is present;
generating one or more computational models based on the first training data and the second training data, the one or more computational models to identify abnormalities present in vessels of brains of individuals;
accessing one or more additional images of a brain of an individual, the one or more additional images being captured using a perfusion-based imaging technique or a diffusion-based imaging technique;
determining one or more patterns of the one or more perfusion parameters or the one or more diffusion parameters included in the one or more additional images;
analyzing, using the one or more computational models, the one or more patterns in relation to the first plurality of patterns and the second plurality of patterns to determine a measure of likelihood that an abnormality is present in the brain of the individual; and
generating, based on the measure of likelihood, a user interface that includes an indication that an abnormality is present in the brain of the individual.

18. The one or more non-transitory computer-readable media of claim 17, wherein the operations comprise:
generating user interface data that corresponds to the user interface and indicating values of the one or more perfusion parameters with respect to voxels of the imaging data;
wherein a first range of values of the one or more perfusion parameters are displayed as a first color in the user interface and a second range of values of the one or more perfusion parameters are displayed as a second color in the user interface.

19. The one or more non-transitory computer-readable media of claim 18, wherein the operations comprise:
generating additional user interface data that corresponds to an additional user interface indicating intensity values of voxels, the additional user interface indicating vessels of the brain of the individual, wherein a portion of the voxels that correspond to the vessels of the brain of the individual have greater intensity values than additional voxels.

20. The one or more non-transitory computer-readable media of claim 19, wherein the user interface and the additional user interface are displayed together; wherein the user interface data and the additional user interface data are configured to be rendered to generate a combined user interface that includes the user interface and the additional user interface and wherein the region of the brain of the individual is highlighted in the user interface and highlighted in the additional user interface.

* * * * *